TELEPHONE ANSWERING DEVICE

Filed Sept. 28, 1965

INVENTORS
James R. Owen
Henry Replin

BY [signature]

ATTORNEY

INVENTORS
James R. Owen
Henry Replin

BY [signature]
ATTORNEY

INVENTORS
James R. Owen
Henry Replin

BY [signature]

ATTORNEY

March 10, 1970 J. R. OWEN ET AL 3,499,993

TELEPHONE ANSWERING DEVICE

Filed Sept. 28, 1965 10 Sheets-Sheet 4

INVENTORS
James R. Owen
Henry Replin

BY [signature]

ATTORNEY

TELEPHONE ANSWERING DEVICE

INVENTORS
James R. Owen
Henry Replin

BY [signature]
ATTORNEY

INVENTORS
James R. Owen
Henry Replin

BY [signature]
ATTORNEY

INVENTORS
James R. Owen
Henry Replin

BY [signature]

ATTORNEY

INVENTOR
JAMES R. OWEN
HENRY REPLIN

BY [signature]

ATTORNEY

INVENTOR
JAMES R. OWEN
HENRY REPLIN

BY [signature]
ATTORNEY 3,499,993

TELEPHONE ANSWERING DEVICE

James R. Owen, Costa Mesa, Calif., and Henry Replin, Denver, Colo., assignors to Phonemaster, Inc., a corporation of Texas Filed Sept. 28, 1965, Ser. No. 490,947
Int. Cl. H04m 11/10
U.S. Cl. 179—6 21 Claims

ABSTRACT OF THE DISCLOSURE

Telephone answering apparatus utilizes an endless recording tape system for recording and playing back messages to a caller, and recording and receiving messages from the caller. Acoustical and magnetic couplers interface with a standard telephone hand receiver, and means are provided for monitoring incoming calls without answering the telephone itself. Circuit means responsive to the ringing of the phone actuates an announcement portion. the end of which actuates a tape for recording messages from the caller. Playback and re-playback of received messages may be effected remotely by use of an extraneous tone signal. Switching means responsive to the amount of recording medium available for utilization by the record and playback means prevent breakage of the recording medium, and also prevent operation of the apparatus in the event sufficient tape medium is not available for recording of messages.

The present invention relates to telephone answering equipment and more particularly to an improved telephone answering device wherein immediate access to recorded messages can be obtained.

Telephone answering devices which are capable of sensing the presence of an incoming call, playing back a prerecorded message to the caller and thereafter recording a message from the caller have been accorded a substantial amount of acceptance. Such systems can either be connected directly into the telephone line or the pickup of incoming messages can be accomplished acoustically or electrically without being directly connected into the telephone system. Devices which are connected directly into the telephone system have the advantage of more efficient recording and transmission. However, such systems are not portable and in many instances it is not possible to obtain permission of the company owning the system to make connections into the lines.

The present invention provides a telephone answering system which is suitably of the portable type utilizing an acoustical and magnetic coupling to receive and transmit messages into telephone lines. However, the principles of the invention can be incorporated into an answering device adapted for connection into the telephone line. One of the features of the present invention is the provision of an endless tape system for recording messages and a storage system for the endless tape which provides the important advantage of immediate access to messages which have been received. The apparatus of the present invention is extremely versatile and includes provision for playback of received messages at a remote telephone station. Provision is also made for rewinding of the recording medium, either remotely or locally, to permit messages to be played back a second time in the event the operator of the machine should be unsure of the message received. Still another important feature is the provision of central circuitry which permits the telephone to be answered in the normal manner without the necessity for operating the answering system.

In accordance with the preferred embodiment of the present invention, there are provided two bins, referred to as the record bin and the playback bin, adapted for storing portions of a continuous loop of recording medium. There is also provided a separate drive system associated with each of the two bins. The recording medium is driven from each bin into the other bin by the two drive systems. When the record drive means is actuated, the medium is transferred from the playback bin to the record bin. As this occurs, any old messages on the recording medium are erased and new messages are recorded thereon. The recording medium stored in the record bin will at all times contain recording medium storing messages which have not been received. When the recording medium is transported from the record bin into the playback bin, messages stored on the recording medium will be reproduced audibly but not erased. The recording medium stored in the playback bin will therefore contain recording medium storing messages which have been received by the operator. There is provided rewind means for reversing the playback drive means to transfer the recording medium from the playback bin to the record bin without erasing the messages stored thereon in order that messages can be replayed as many times as may be desired. In accordance with the preferred embodiment of the invention, it is possible to actuate the rewind mechanism by signaling the device with an extraneous tone signal from a remote location, the rewind being effected for the duration of the tone signal. Also, the presence of the tone signal actuates the device to play back the message when signaled from a remote location.

A first passive element is utilized to establish the length of messages received and recorded, and a second passive element is utilized to insure that a sufficient quantity of the recording medium is available in the playback bin to permit complete playback of all messages. Switches responsive to removal of the recording medium from a bin are provided to reduce the possibility of the recording medium being damaged by operation of the drive means.

Many objects and advantages of the invention will become readily apparent to those skilled in the art as the following detailed description of a preferred embodiment of the same unfolds when taken in conjunction with the appended drawings wherein like reference numerals denote like parts and in which.

Figure 12A:
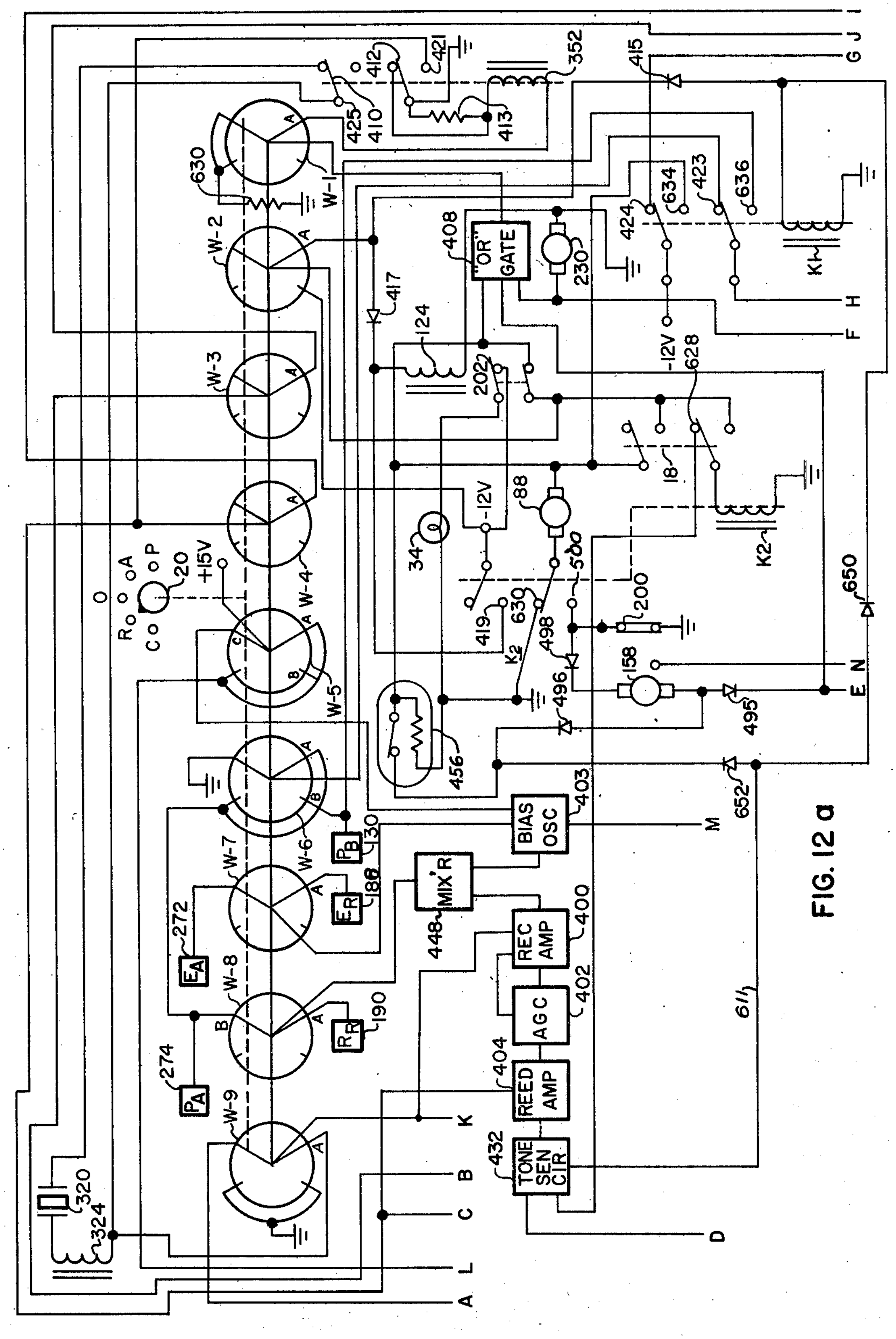
Figure 12B:
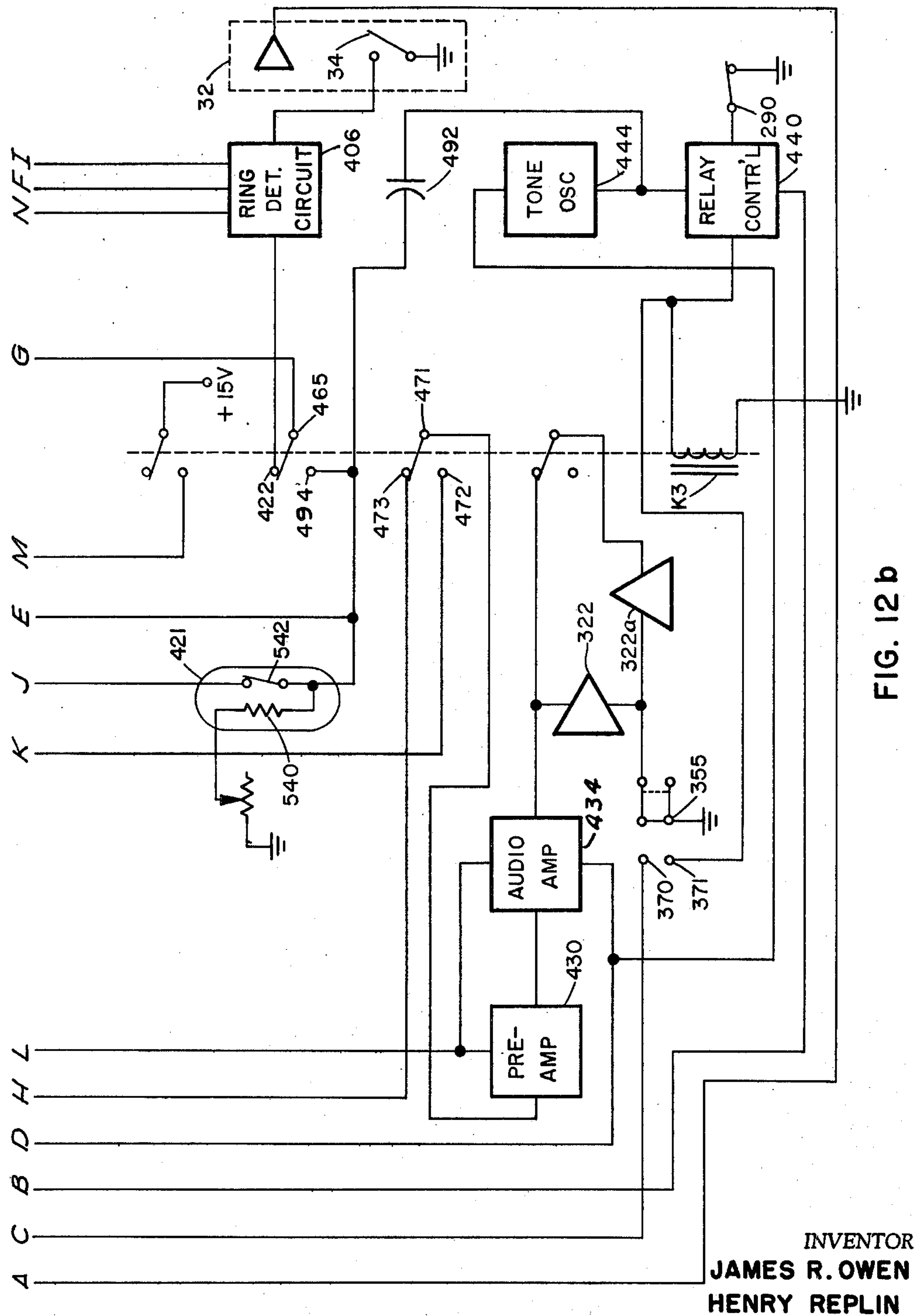
Figure 13:
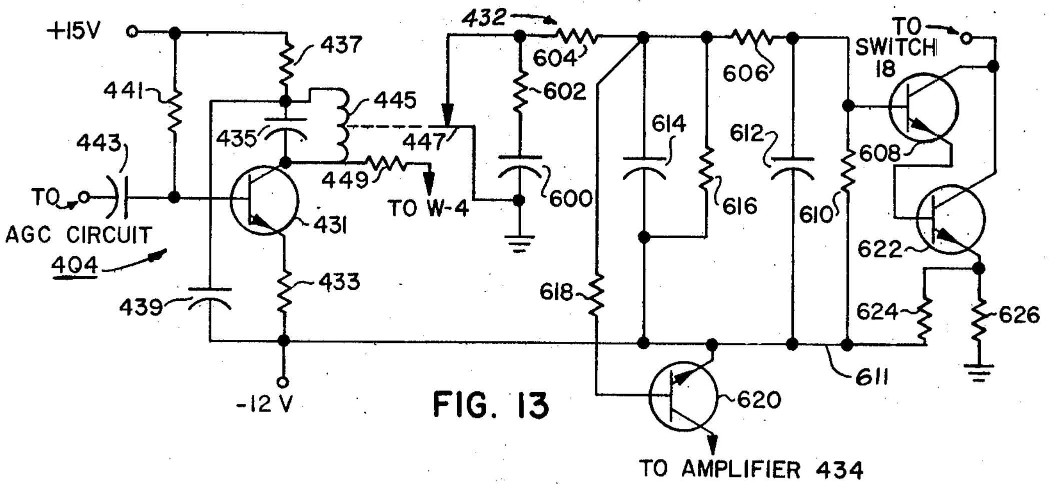
Figure 14:
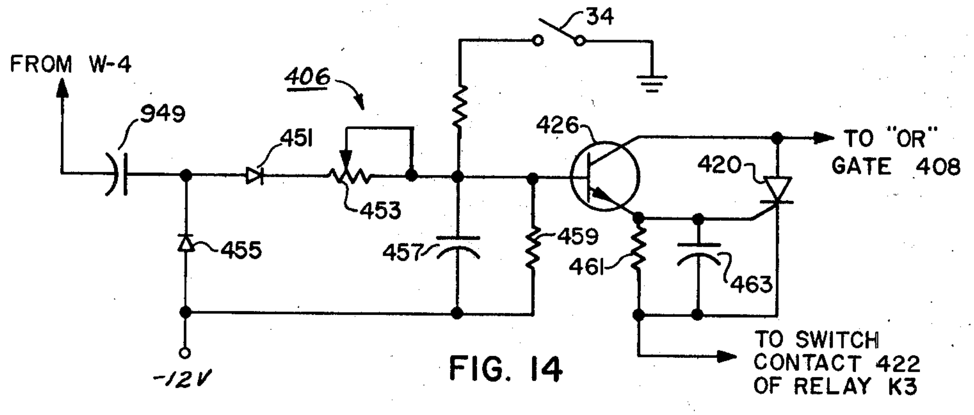

FIGURES 12*a* and 12*b* diagrammatically illustrate the control circuitry utilized in the preferred embodiment of the telephone answering system of the present invention;

FIGURE 13 is a schematic diagram of a reed amplifier and tone sensing circuit;

FIGURE 14 is a schematic diagram of a ring detector circuit; and

Figure 15:
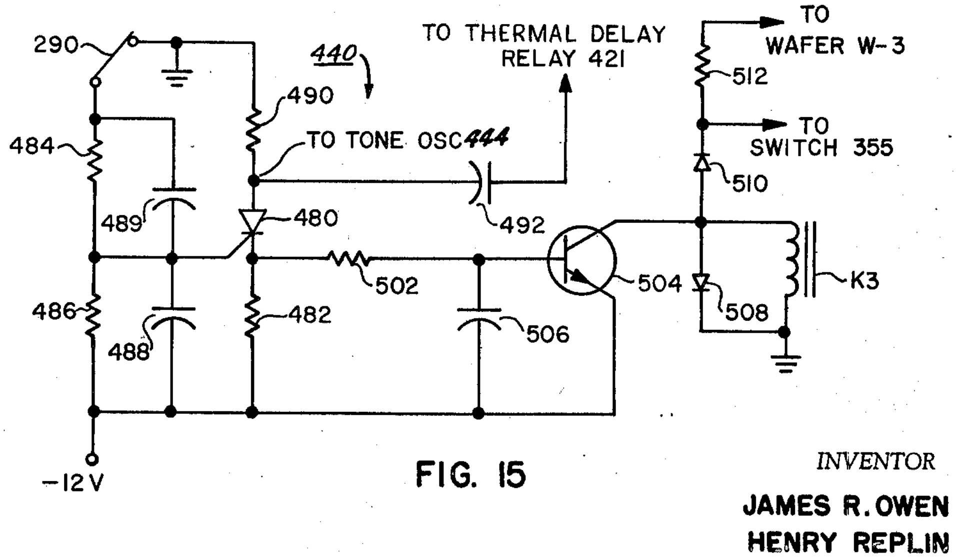

FIGURE 15 is a schematic diagram of a tone oscillator and relay control circuit.

Figures 1, 6:
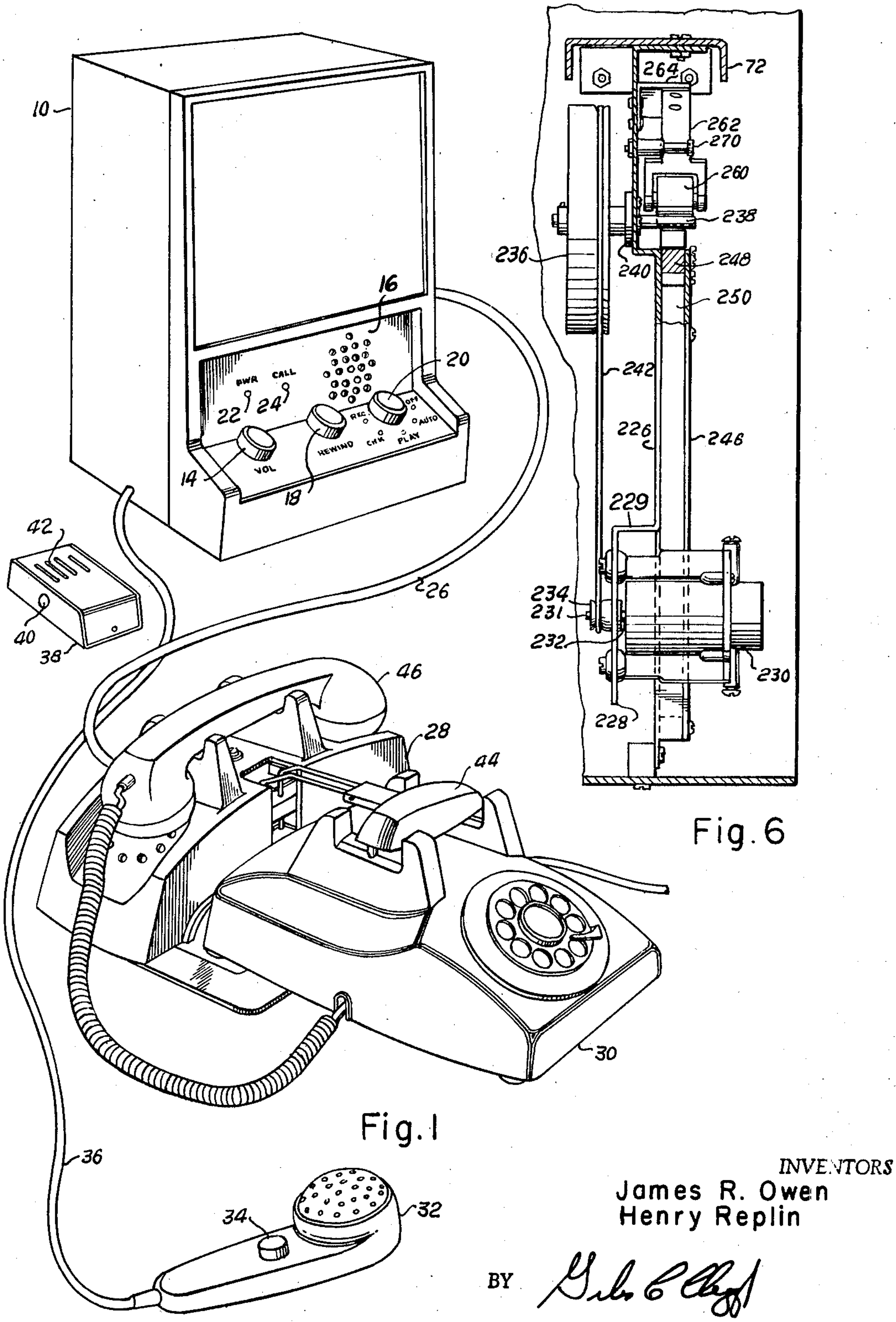
FIGURE 1 is a perspective view illustrating a preferred embodiment of a telephone answering system in accordance with the present invention.
FIGURE 6 is a view taken along line 6—6 of FIGURE 2 illustrating the mechanical details of that portion of the apparatus utilized for recording and playback of the announcement used in answering a telephone.

Turning now to FIGURE 1 of the drawings, there is shown a perspective view of the telephone answering device of the present invention. The major portion of the control circuitry and the recording apparatus is enclosed within unit 10. Positioned on the front of the unit 10 is a knob 14 which is effective when operated to control a variable resistor within the control circuitry for purposes of varying the volume of sound reduced when the messages are to be played back through a speaker (not shown) positioned behind grill 16. There is also provided a knob 18 which controls a spring loaded rewind switch and knob 20 which controls a function switch. The knob 20 is settable to each of five positions of the switch controlled by the knob 20, being denoted as Off, Auto, Play, Check and Record. There is also provided lamp 22 which is effective when energized to show that power is applied to the device and a light 24 which is energized when a call has been received and recorded by the device. The lamp 24 therefore provides an indication to the operator as to whether the machine should be interrogated for the purpose of receiving messages recorded by the device. Electrical cable 26 is provided for connecting a portion of the control circuitry within the unit 10 to the remainder of the control circuitry physically located within a telephone lifting device 28 operatively connected to a telephone 30 which is to be answered. There is also provided a hand microphone 32 having a switch button 34 provided thereon. The hand microphone 32 is connected to the control circuitry within the unit 10 by cable 36. Also associated with the answering system, but not connected thereto either electrically or mechanically is a small, portable tone generator 38. When the button 40 of the tone generator 38 is pressed, a tone of fixed frequency emanates from a speaker (not shown) positioned behind the grill 42.

In operation of the device, the lifting device 28 is positioned adjacent the telephone set 30, as shown, with the arm 44 of the lifting device 28 bearing against the buttons normally provided on a telephone set and the receiver 46 of the telephone resting on the main body portion of the lifting device 28. Function switch 20 is placed in the Record position, placing the apparatus in condition to store a prerecorded message which is to be used in answering the phone in the event of a call. To store the message, button 34 of the hand microphone 32 is operated and the desired message is spoken into the microphone by the operator. After the prerecorded message has been placed in the machine, the function switch 20 is placed in the Check position, and when the button 34 is again operated, the prerecorded message will be played back, permitting the operator to assure himself that the message to be given to callers is as desired. Function switch 20 is then placed in the Auto position, and the apparatus is in condition to answer the telephone at such time as ringing of the telephone indicates receipt of a call, greet the caller with the recorded message, and then record messages which may be received.

An important advantage of the device of the present invention is that the telephone can be answered by the operator at any time beginning with the ringing of the telephone and prior to the end of the call by merely lifting the receiver from the lifting device and without the necessity for operating switches or otherwise acting to change the mode of operation of the machine. Thus, if the operator is present but does not wish to accept calls, the machine will answer the phone in the normal manner. The speaker positioned behind the grill will broadcast the announcement and any messages of each call, permitting the operator to monitor all calls without notice to the caller. Volume control 14 permits the operator to adjust the output of the speaker to any desired level. If after learning the identity of the caller the operator wishes to answer the call, or if the operator wishes to answer the phone upon the first ringing signal, the receiver is lifted from the lifting device 28. When the receiver is lifted, the control circuitry of the apparatus will automatically prevent the recording of messages and the playback of the announcement and the apparatus will be in readiness to answer subsequent calls upon the receiver being returned to position on lifting device 28. It is therefore possible to utilize the telephone in the normal manner if desired without any inconvenience occasioned by the answering device.

At such time as the operator desires to receive the messages which have been stored, the operator interrogates the machine by placing the function switch 20 in the Play position and operating the button switch 34 on the hand microphone 32. In the event it is desired to replay a message, the rewind switch 18 is operated for the necessary length of time and then released. When the rewind switch, which is spring loaded, is released, the message will be replayed. It is, of course, possible to replay any message or any portion of a message as many times as may be desired.

It is also possible to receive messages stored by the machine from a remote location when the function switch 20 is in the Auto position. This is accomplished by dialing the number of the telephone being answered from a remote telephone. After the machine has answered the call, the operator places the tone generator 38 in a position such that the grill 42 is near the mouthpiece of the phone being used by the operator. When the button 40 is operated, a tone will be produced by the tone generator 38 which actuates circuitry within the unit 10 to cause messages stored by the machine to be played back into the mouthpiece of the receiver 46, permitting the operator to hear the messages. Rewind capability is also provided from remote locations in the event the operator should not understand the message or for some other reason should want the message repeated. This is accomplished by maintaining the button 40 of the tone generator 38 depressed for the time which it is desired to rewind the machine.

Having now described the preferred manner in which the apparatus provided by the present invention is utilized, a detailed description of the preferred embodiment of the invention will continue.

Turning to FIGURES 2–6 of the drawings, there is shown the mechanical details of unit 10 of a telephone answering device in accordance with a preferred embodiment of the invention. In FIGURES 2–5, electrical connections have not been shown, as to do so would unduly complicate the drawings and render if difficult to understand the mechanical constuction.

The mechanical structure of the interior of the unit 10 is shown in FIGURES 2–5 of the drawings and can be seen to comprise a sheet of material bent in a U-shaped configuration to define two side portions 50 and 52 and a base portion 54. There are also provided three partition members 56, 58 and 60 (FIGURE 4) which are mounted between side portions 50 and 52 in a vertically disposed arrangement. Spacers 62 and 64 are provided for maintaining the plate members 56, 58 and 60 in parallel relationship with a bin 66 defined between parallel plates 56 and 58 and the second bin 68 defined between parallel plates 58 and 60. The bin 66 will hereinafter be referred to as the record bin and the bin 68 will be referred to as the playback bin. In accordance with the preferred embodiment of the invention, the recording medium used is magnetic tape and the width of each of the bins is greater than the width of the tape but substantially less than twice the width of the tape to minimize tangling.

Also extending between the side portions 50 and 52 is a pair of horizontally disposed members 70 and 72. The horizontally disposed member 70 supports a first tape drive mechanism 74 and the horizontally disposed member 72 supports a second tape drive mechanism, designated generally by the reference character 76. The tape drive mechanism 76 will be referred to as the record drive and the drive mechanism 74 will be referred to as the playback drive.

The playback drive 74 can be seen to comprise an L-shaped bracket member 78 that includes a base portion 80 which rests upon the horizontally disposed member 70 and an upright vertically disposed portion 82 upon which several different components are mounted. There is also provided a vertically disposed plate member 84 which is connected to a vertically disposed portion 82 of the bracket 78 by a plurality of spacers 86. It will be noted that slots 61 are provided in the base 80 through which screws 63 pass for attaching member 78 to member 70. The slots 61 permit adjustment of the playback drive assembly relative to bins 66 and 68.

Figure 5:
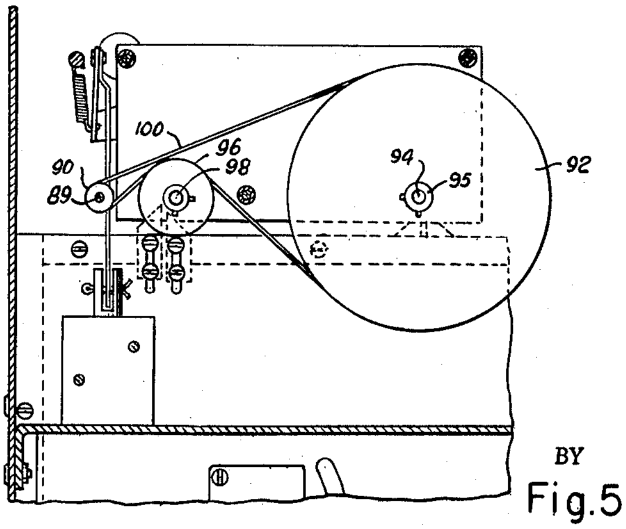
FIGURE 5 is a view taken along line 5—5 of FIGURE 4.

A motor 88 is mounted to a portion 82, with the shaft 89 of the motor extending through the member 82 and carrying a pulley 90 which is mounted to the shaft between portion 82 and member 84. Also mounted between the plates 82 and 84 is a pulley 92 which is mounted on shaft 94 and a second pulley 96 which is mounted on shaft 98. Shafts 94 and 98 are journaled for rotation in bearings 95 and 97, respectively. The pulleys 92 and 96 are coupled to pulley 90 by belt 100, as best shown in FIGURE 5. The shafts 94 and 98 each extend through the plate member 84, as best shown in FIGURE 2.

There is also provided an elongated member 102 (FIGURE 2) which is pivotally connected to the plate member 84 at 104. A first roller member 106 which is free to turn on a shaft 108 is connected to member 102 by a leaf spring member 110. Similarly, roller 114 which turns on shaft 116 is connected to member 102 by leaf spring member 118. The length of the leaf spring members 110 and 118, respectively, is such that the rollers 106 and 114 will bear against the shafts 94 and 98, respectively, depending upon the position of the member 102.

Thus, there is provided a coil spring 120 which is connected to member 102 at 122 and to the plate 84. The spring 120 biases the member 102 in a position such that the roller 106 will bear against the shaft 94 with the roller 114 being spaced apart from the shaft 98. There is also provided a solenoid 124 having an armature 126 which is connected by member 128 to the member 102. When solenoid 124 is energized, the member 102 will pivot about point 104 against the force of the spring 120, causing the roller 114 to bear against shaft 98, removing roller 106 away from shaft 94.

Figure 2:
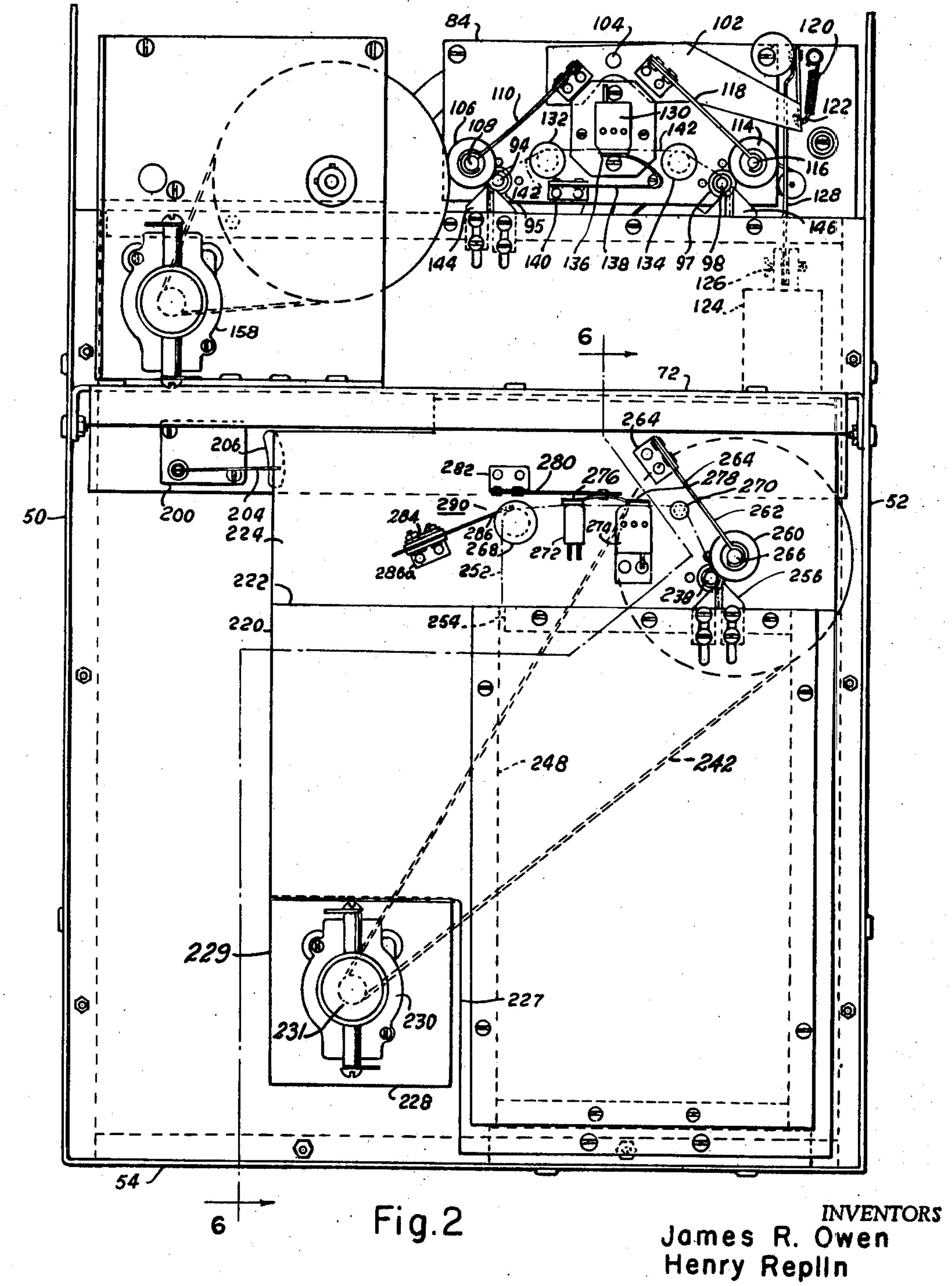
FIGURE 2 is a rear elevation view of the apparatus of the present invention with the case removed.

Also mounted to the plate member 84, as can be best observed in FIGURE 2, is a magnetic playback head 130 and a pair of guide members 132 and 134. Pad 136, suitably of felt material, is biased against the magnetic playback head 130 by spring member 138 which is connected to the plate member 84 by bracket 140. The magnetic recording tape 142, indicated in phantom, passes over the guide members 132 and 134 between the playback head 130 and the felt member 136. The magnetic tape 142 also passes between roller 106 and shaft 94 through guide member 144 into the playback bin 68. The magnetic tape is also threaded between shaft 98 and roller 114 through tape guide member 146 into the record bin 66.

When power is applied to playback motor 88, shaft 94 will rotate in a counter-clockwise direction, as viewed in FIGURE 2, and shaft 98 will rotate in a clockwise direction. When the solenoid 124 is not energized, the spring 120 will bias the member 102 upward, causing the roller 106 to bear against the shaft 94 to drive the magnetic tape 42 out in a direction from the bin 66 into the bin 68. As the tape moves across the playback head 130, the information stored on the magnetic tape will be played back. On the other hand, if the solenoid 124 is energized, the member 102 will be pivoted in a clockwise direction against the spring 120, causing the roller 114 to bear against the shaft 98 and spacing the roller 106 apart from the shaft 94. The magnetic tape will therefore be pulled from the bin 68 and driven into the bin 66, providing a rewind function.

As mentioned previously, the record drive assembly 76 is supported by the horizontally disposed member 72. The record drive assembly 76 is similar to the playback drive assembly 74 in that it includes (FIGURE 2) an L-shaped bracket member 150 having a base portion 152 which rests upon the horizontal member 72 and a vertically disposed portion **152*a*. Slots 153 through which screws 155 pass are provided for adjustable mounting of the record drive 76. A vertically disposed plate member 154 is also provided, the plate member 154 being spaced apart from the member 150 connected thereto by spacers 156**.

Figure 3:
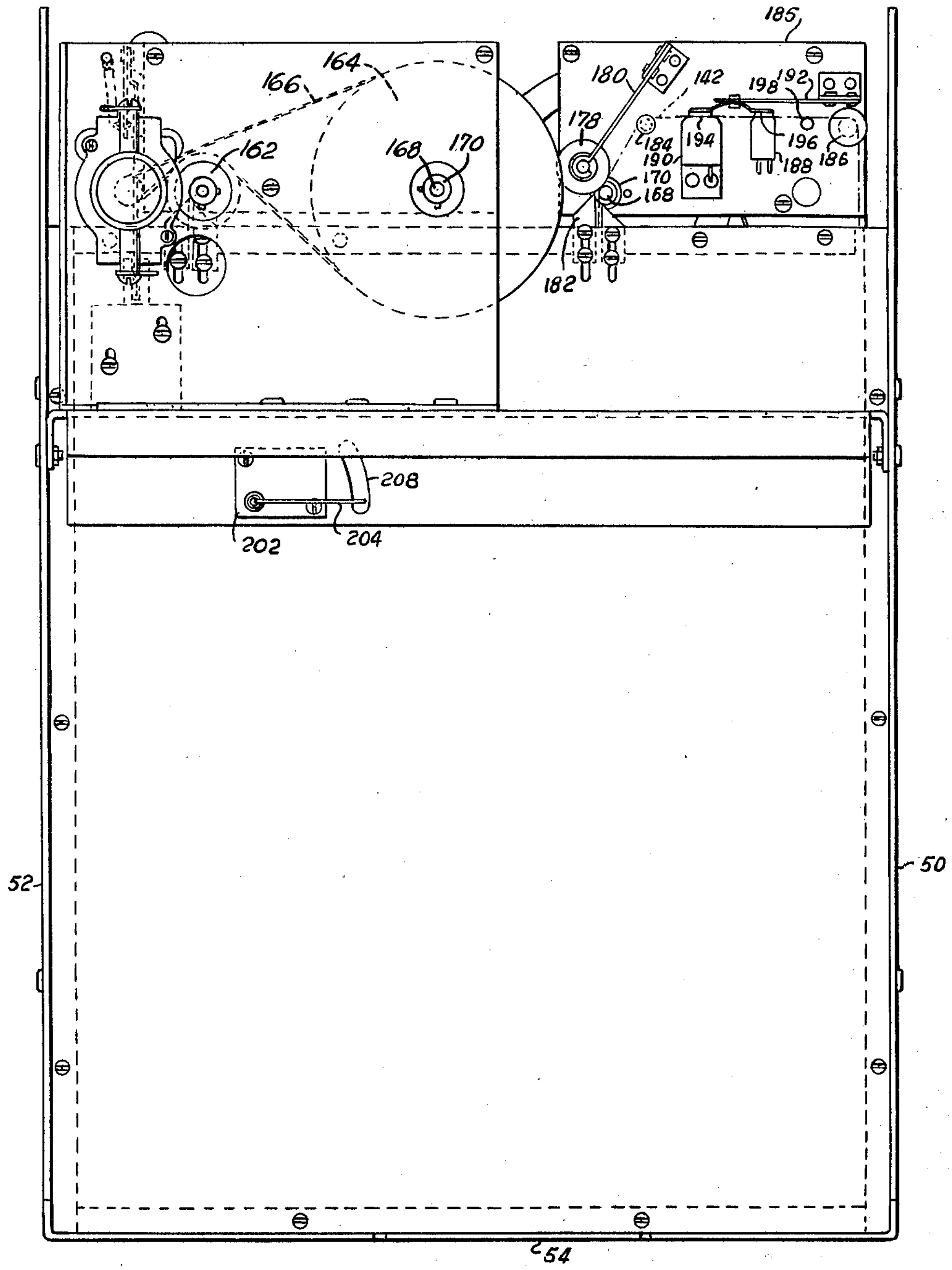
FIGURE 3 is a front elevation view of the apparatus of the present invention with the case removed.
Figure 4:
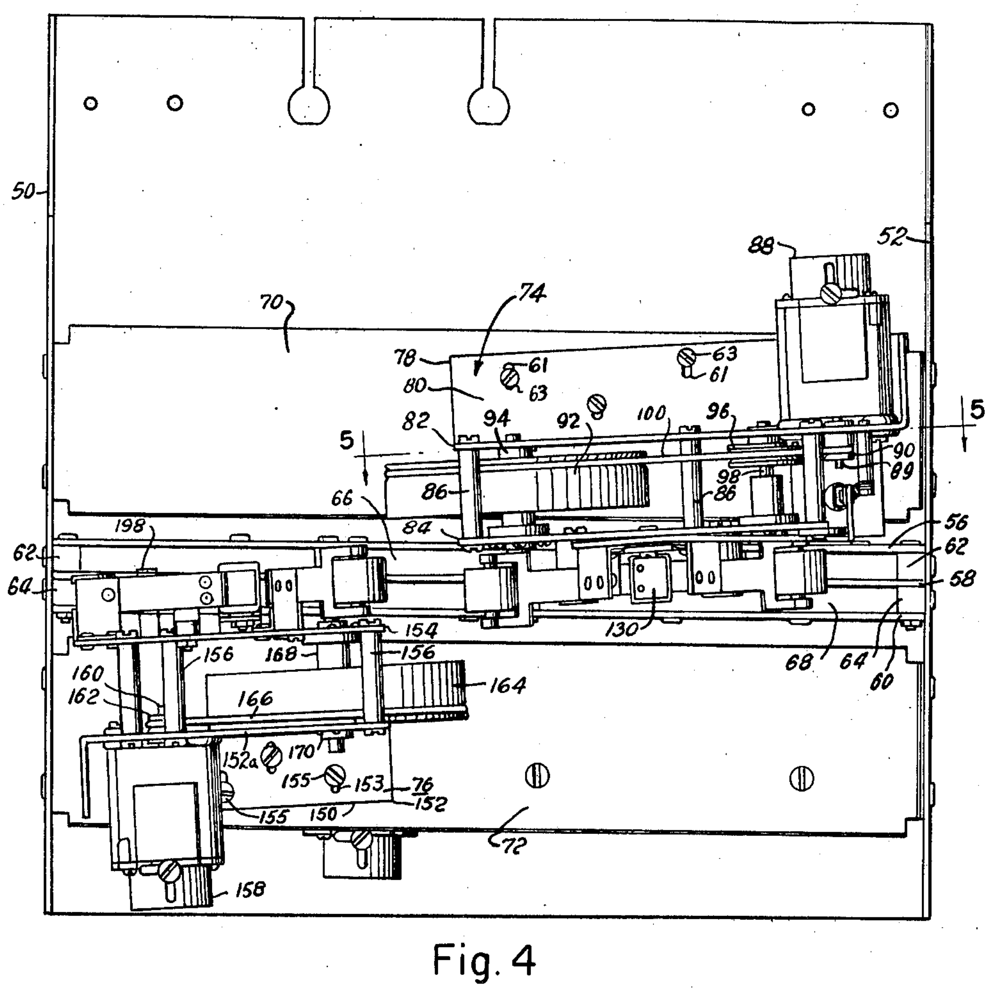
FIGURE 4 is a plan view of the apparatus of the present invention with the case removed.

A record motor 158 is mounted to a vertical portion **152*a* with the shaft 160 of the motor extending through portion 152*a* and carrying a pulley 162. The pulley 162 is coupled to pulley 164 by belt 166, the pulley 164 being mounted for rotation with shaft 168 which is journaled for rotation in bearings 170. As best seen in FIGURE 3 of the drawings, there is also provided a roller 178 which is mounted to the member 185 by a resilient leaf spring 180. The roller 178 bears against the shaft 168 such that when the shaft 168 turns in a counter-clockwise direction, as viewed in FIGURE 3, the magnetic tape 142 will be pulled from the playback bin 68 and fed into record bin 66 through tape guide 182. There are also provided tubular tape guide members 184 and 186 which control the path of the tape as it passes across magnetic erase head 188 and recording head 190. There is also provided a resilient leaf spring member 192 which is mounted to the member 185. The spring member 192 carries a pair of felt members 194 and 196 which press the magnetic tape against the magnetic heads 190 and 188, respectively. Magnet 198 also projects outwardly from the plate member 185 with the tape 142 passing across the magnet 198. The magnet 198 functions to erase any intelligence which may be recorded on the tape 142 at times that the tape 142 may be moved by the shaft 168 when the heads 188 and 190** are not energized.

There is also provided a pair of switches 200 and 202 (FIGURES 2 and 3) associated with the bins 68 and 66, respectively. Switch 200 is suitably a single pole switch and switch 202 is suitably a double pole switch. Each of the switches 200 and 202 include an elongated member 204 which is bent at right angles to extend into slots 206 and 208, respectively, formed in the sides of the bins 68 and 66. So long as each of the bins contain a substantial amount of tape, the switches 200 and 202 will be in the position shown. However, as all of the tape is removed from one of the bins, the loop of the tape in the bin will move upward, causing the member 204 to swing upward, changing the condition of the associated switch. As will be explained in greater detail with reference to the electrical portion of the apparatus, when the switch 200 is actuated by movement of its lever 204 upward, the motor 158 will be cut off, preventing the tape being broken. Similarly, actuation of the switch 202 by lever 204 being moved upward when the tape has been drawn from the bin 66 will cause motor 88 and lamp 24 to turn off. During rewind, operation of switch 200 will turn motor 88 off, but will not otherwise affect motor 88.

As mentioned previously, there is provided both a message tape on which messages received are stored and an announcement tape on which is stored a prerecorded announcement utilized in answering the telephone. As best seen in FIGURES 2 and 6 of the drawings, there is provided a vertically disposed member 220 which extends between base portion 54 and horizontally disposed member 72. The member 220 is bent along line 222 to provide a portion 224 which lies in a plane parallel to but spaced apart from the main portion 226 of the member 220. Member 220 is also cut along line 227 to provide a depending portion 228 which is bent along line 229 and also lies in a plane parallel to but spaced apart from the main portion 226.

The announcement motor 230 is mounted to the depending portion 228 with the shaft 231 of motor 230 extending therethrough and journaled for rotation in bearing 232. Pulley 234 is mounted onto the shaft 231 for rotation therewith. There is also provided a pulley 236 which is mounted on shaft 238. Shaft 238 passes through the portion 224 of member 220 and is journaled for rotation in bearing 240. Pulley 236 is mechanically coupled to pulley 234 by belt 242 such that rotation of the motor 230 will produce rotation of pulley 236.

There is also provided a rectangular plate member 246 (FIGURE 6) which is connected to portion 226 of member 220 but spaced apart therefrom by spacers 248. The portion 226 of member 220, plate 246 and spacers 248 define a bin 250 into which the announcement tape 252 (shown in phantom) passes through slot 254 and tape guide 256.

A roller 260 which is resiliently mounted to the member 220 by leaf spring member 262 is provided, the member 262 being connected to portion 224 by bracket 264. Roller 260 bears against the shaft 238 and is free to turn on shaft 266 such that rotation of the shaft 238 in a clockwise direction (as viewed in FIGURE 2) will be effective to drive the magnetic recording tape 252 into the bin through the guide members 256, the roller 260 being effective to hold the tape 252 against the driven shaft. A pair of tape guide members 268 and 270 control the path of the magnetic tape 252 as it passes out of the bin 250 across the erase head 272 and record head 274. Felt members 276 and 278 bear against the erase head 272 and record head 274 in conventional fashion for holding the tape against the heads as it moves thereacross. Felt members 276 and 278 are suitably supported by resilient spring member 280 which is connected at one end to the member 220 by bracket 282.

There is also provided a resilient conductive member 284 which is supported by but insulated from bracket 286*a* which is connected to member 220. The other end of resilient conductive member 284 carries a contact portion 286 which bears against the tape 252 as it moves across guide member 268. Tape 252 is provided with an aperture. When the portion of the tape containing the aperture moves across guide 268, the contact portion 286 of resilient member 284 will pass through the aperture into electrical contact with the guide member 268. Resilient member 284 and guide member 268 therefore function as a switch 290 which is open normally but closed when that portion of the magnetic tape 252 containing the aperture lies between contact member 286 and guide member 268.

From the above, it will be seen that when the motor 230 is energized, it will drive shaft 238, causing tape 252 to be withdrawn from bin 250 through slot 254. Tape 252 will pass across guide 268, erase head 272, record head 274 and tape guide 270. From tape guide 270, the tape 252 will pass across shaft 238, which is driven by motor 230. Tape 252 is held against rotating shaft 238 by rotatable resilient roller 260 and passes through guide 256 into bin 250. The length of tape 252 is such that the time required for one rotation of the loop of the tape is sufficient to store a desired message, suitably in the order of 20 seconds. The exact length of the tape will, of course, be dependent upon the speed at which rotating shaft 238 drives the tape.

Turning now to FIGURES 7–11 of the drawings, there is shown one embodiment of a telephone lifting device 28 suitable for use in practicing the invention. The lifting device 28, in the form shown, comprises a case 302 having upright vertical members 304 extending upwardly therefrom to form a cradle for supporting the receiver 306 of a telephone in a manner similar to a standard telephone set 30. Projecting vertically outward from each of the upright members 304 is a button 310 which is depressed when the receiver 306 is in position. The case 302 is formed with depressed regions at 312 and 314 to provide indentations in which the mouthpiece 313 and earpiece 315 respectively of the receiver 306 fit. The lifting device 28 is also provided with plate member 316 adapted to support the rear portion of the telephone set 30. Extending out of the lifting device is a button depressing member 318 adapted to depress the buttons 317 conventionally found on a telephone set. Cable 26 extends from the telephone lifting device 28 to the unit 10 of the telephone answering system and serves to make the necessary connections between the two items. Mounted on one side of the case 302, and adapted to bear against the back of the telephone set 30, is a contact microphone 320 which senses the ringing of the telephone.

Figure 7:
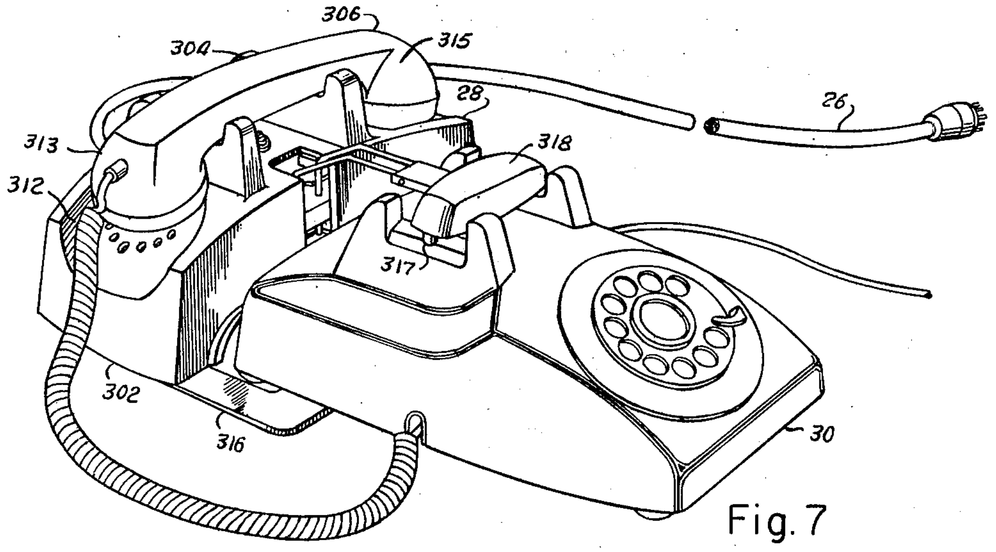
FIGURE 7 is a perspective view illustrating a telephone lifter device in accordance with one embodiment of the present invention.
Figure 8:
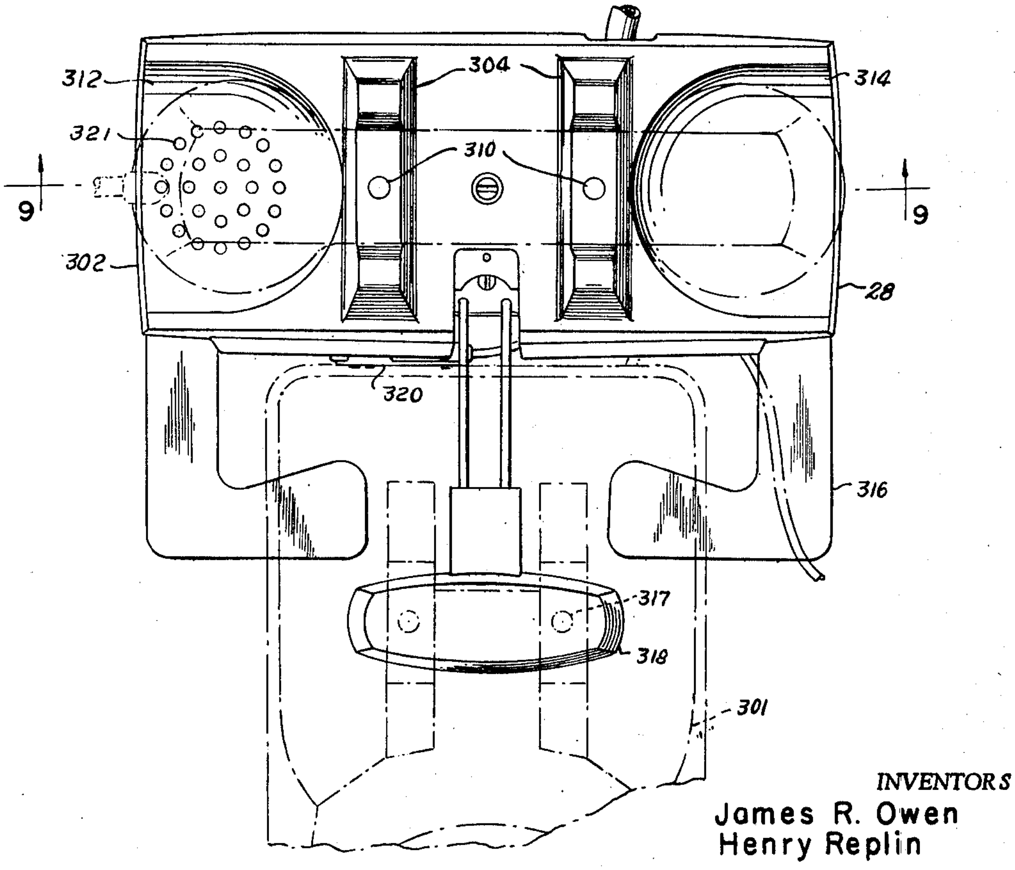
FIGURE 8 is a plan view of the telephone lifter device of FIGURE 7 further illustrating the manner in which a telephone lifter device is positioned relative to a telephone receiver.
Figure 9:
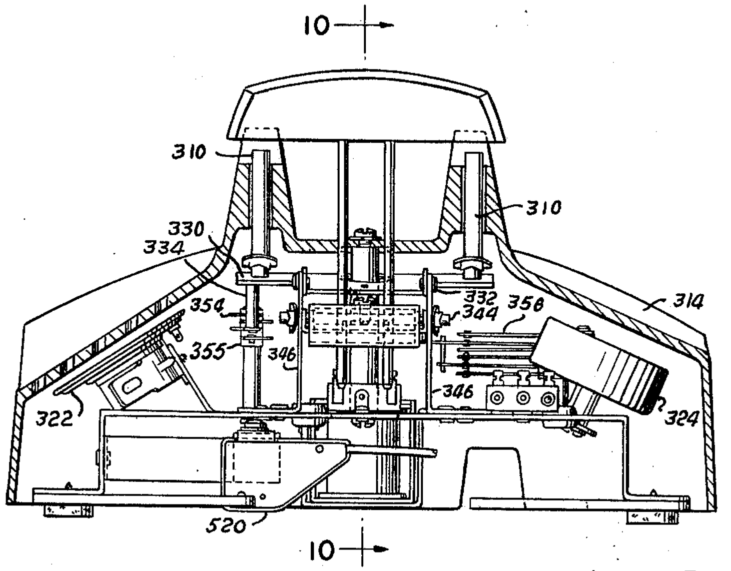
FIGURE 9 is a view taken along line 9—9 of FIGURE 8.

As best seen in FIGURES 8 and 9, the depressed portion 312 is provided with a plurality of perforations 321 and a small loud speaker 322 is mounted within the case directly beneath the depressed portion 312. When the hand receiver is placed on the lifting device 28, as shown in FIGURE 7, the mouthpiece 313 of the hand set will be in position over the recessed portion 312. A magnetic pickup coil 324 is positioned beneath the recessed portion 314 such that it will be in close proximity to the earpiece 315 of the receiver 306. Thus, the pickup coil 324 is magnetically coupled to the magnetic coil within the earpiece 315 for purposes of receiving messages and the loud speaker 322 functions as a source of voice signals providing the recorded announcement used in answering the telephone by the device.

Figure 10:
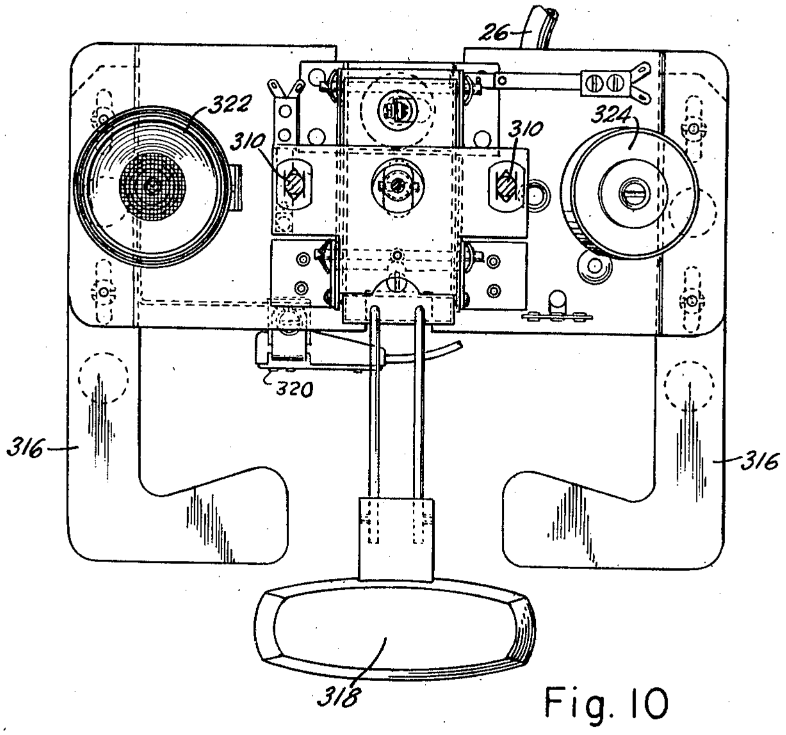
FIGURE 10 is a plan view similar to FIGURE 8 but with the cover removed.
Figure 11:
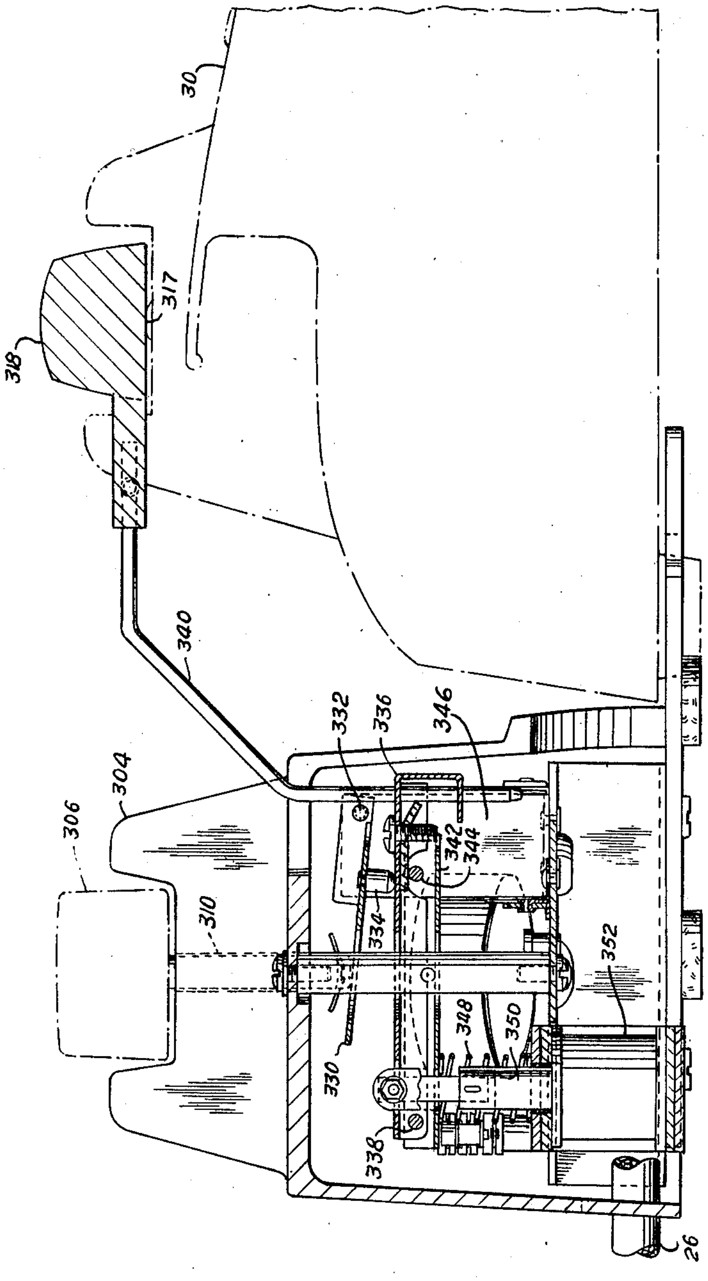
FIGURE 11 is a side elevation view further illustrating the operative relationship between the lifting device and a telephone hand set, with a portion of the cover of the telephone lifting device broken away to reveal the operation of the mechanism contained therein.

Located interiorly of the case 302, as best seen with reference to FIGURES 9–11, is a plate member 330 which is pivotally connected to upright members 346 at one end by pins 332. Plate member 330 carries a rod member 334 at an intermediate point, the rod member 334 being directly downward and suitably rounded at one end. The rounded end portion of the rod member 334 bears against the leaf 354 of switch 355. The condition of switch 355 indicates whether the telephone has been "answered" by raising member 318, permitting the buttons 317 to rise to the answered position operating switches within the set 30. It will be noted that the buttons 310 bear against the upper surface of member 330, and when the receiver 306 is supported by upright members 304, the weight of the receiver acting through buttons 310 will cause member 330 to pivot downwardly. There is also provided a horizontally disposed member 336 which is pivotally connected to shaft 338 at one end. The free end of member 336 carries a pair of upwardly extending rods 340 which terminate in button depressing member 318. The rods 340 are of a length and shape such that movement of member 336 downward through a small arc will cause the member 318 to depress buttons 317, but movement upward will release the button 317.

When the telephone receiver is not in place on either the lifting device 28, springs associated with the buttons 317 of the telephone set 30 will force the member 318 upward, causing member 336 to pivot about the shaft 338. If, however, the telephone receiver is in position on the lifting device 28 as shown in FIGURE 7, the buttons 310 will bear against the member 330, causing the member 330 to bear against the member 336 and hold the member 318 down, causing the buttons of the telephone set to be depressed with the telephone in condition to receive a call. Thus, raising the receiver 306 from the cradle formed by members 304 frees the buttons 317 similar to lifting the receiver from the cradle of the set when the lifting device is not present, and normal operation of the telephone is possible.

The shaft 338 is carried by a channel member 342 which is pivoted about shaft 344 at the end opposite from that of the shaft 338. As best seen in FIGURES 9 and 11, the shaft 344 passes through the pair of upright members 346 which are connected to the base of the telephone lifting device and thereby fixed in place. The end of the member 342 carrying the shaft 338 is biased upward by a spring 348 which encircles the armature 350 of a solenoid 352. The upward movement of the member 342 under the urging of the spring 348 is limited by the length of the armature 350. When the solenoid 352 is energized, the member 342 will be pulled downward, pivoting about the shaft 344, causing the member 318 to be raised, permitting the buttons 317 of the telephone set 30 to move upward in a manner similar to that permitted when the receiver is lifted from the telephone.

From the above, it will be seen that there is provided a mechanism wherein if the telephone receiver is in place on the lifting device and the solenoid 352 is not energized, the member 318 will be in position to depress the buttons on the telephone set 30. However, if the telephone receiver is lifted or if the solenoid 352 is energized, the device 318 will be moved upward, permitting the buttons on the telephone set to be released and indicating that the receiver has been lifted and that transmission can occur.

The electrical circuitry associated with the apparatus of the present invention is diagrammatically illustrated in FIGURES 12*a* and 12*b*. In addition to the solenoid 124, solenoid 352 and switches 18, 20, 200, 202, 290 and 355 mentioned previously with respect to the description of the mechanical features of a preferred embodiment of the invention, there is also provided a playback relay K–1, a rewind relay K–2, and a record relay K–3, all of which cooperate in the control of the apparatus. The function switch 20 comprises nine wafers W–1 through W–9, each of the wafers being commonly settable to five different positions. Since the utilization of the electronic circuitry will depend upon the setting of the function switch, the description of the electronic circuitry will only be made in conjunction with the descriptions of the operation of the circuitry for specific settings of the function switch 20.

FUNCTION SWITCH SET TO AUTO POSITION

The function switch is set to the AUTO position when it is desired that the apparatus automatically answer any calls received, and in response to ringing of the telephone, release of the telephone buttons, broadcast at a prerecorded announcement and record any messages given within a predetermined time interval. Also, when the function switch is in the automatic position, it is possible for calls to be received from a remote location by calling the number being answered and utilizing the tone oscillator 38 in a manner to be described.

The common terminal of wafer W–1 is connected to the output of "OR" gate 408 and terminal A is connected to one side of the solenoid 352, the other side of the solenoid 352 being connected to ground through switch contact 412 which is operated to the open position when solenoid 352 is energized. Solenoid 352 is also connected to ground through resistor 413. The common terminal of wafer W–2 is connected to one side of switch 18. Terminal A of wafer W–2 is connected to the cathode of diode 415 and to the anode of diode 417. The anode of diode 415 is connected through the coil of relay K–1 to ground. The cathode of diode 417 is connected to terminal 419 which is one of the contacts of relay K–2. Terminal A of switch W–3 is connected through line J to one side of a thermal relay 421. The common terminal of wafer W–3 is connected through line B to the relay control 440. The common terminal of wafer W–4 is connected to terminal 421 of solenoid 352 and through line C to terminal 370 of switch 355 and to reed amplifier 404. Terminal A of wafer W–4 is connected through line I to the ring detector circuit 406. The common terminal of wafer W–5 is connected to +15 volts. Terminals A, B and C of wafer W–5 each connect through line L to preamplifier 430 and audio amplifier 434. The common terminal of wafer W–6 is connected to terminal 423 of relay K–1. Contacts A and B of wafer W–6 are connected to the record playback head 274 associated with the announcement tape. Record head 274 is also connected to the terminal B of wafer W–8. The common terminal of wafer W–7 is connected to the bias oscillator 403. Terminal A of wafer W–7 is connected to erase head 188. The common terminal of wafer W–8 is connected to mixer 448 and terminal A of wafer W–8 is connected to the record head 190. The common terminal of wafer W–9 is connected to the preamplifier 430 through line K and contacts 471 and 472 of relay K–3. Terminal A of wafer W–9 is connected to the magnetic pickup coil 324 and to terminal 425 of solenoid 352.

When the phone is in the cradle, the switch 355 will be in the condition shown. When the phone is lifted from the cradle, the condition of switch 355 will change and the contacts 370 and 371 will be connected to ground through switch 355. When contact 371 is connected to ground, it will not be possible to energize the record relay K–3, preventing power being applied to the record motor 158. The contact 370 is also connected to ground, effectively grounding a portion of the reed amplifier circuit 404 through line C, preventing ringing of the telephone having any effect on the reed amplifier 404 and the tone sensing circuit 452. Thus, if the telephone is answered in the normal manner by lifting receiver 306, the apparatus will not be operated, and if the operation sequence has begun, the record motor will not receive power due to the relay K–3 becoming de-energized. The telephone can therefore be used in the normal manner without the necessity for operating any switch associated with the answering device, but the instant the telephone receiver is returned to the lifting device, the answering device is again in condition to answer calls.

In the course of operation of the device, when the telephone rings, the contact mike 320 will sense the presence of the ringing and apply a signal through wafer W–9 to the input of the record amplifier 400. The output of the record amplifier 400 is applied to the automatic gain control circuit 402, whose output in turn is connected to the reed amplifier 404 and tone sensing circuit 432.

The reed amplifier and tone sensing circuit is shown schematically in FIGURE 13 of the drawings. Thus, the reed amplifier 404 can be seen to comprise the transistor 431, whose emitter is connected through resistor 433 to a source of −12 volts and whose collector is connected through capacitor 435 and resistor 437 to +15 volts. The juncture between capacitor 435 and resistor 437 is connected to −12 volts through capacitor 439. The base of transistor 431 is connected through resistor 441 to +15 volts. The signals from the automatic gain control circuit 402 is applied to the base of transistor 431 through a coupling capacitor 443. There is also provided a reed relay having a coil 445 which is connected in shunt with capacitor 435. The reed relay is resonant at the frequency of a signal emitted by the tone oscillator 38. When the base of the transistor 431 is driven by a signal of this frequency, the reed 447 of the tone sensing circuit 452 will be driven at that frequency. However, since the ringing of the telephone will not be of that frequency, the tone sensing circuit 452 will not be operated by the ringing of the telephone. The collector of transistor 431 is also connected through resistor 449 to the common terminal of wafer W–4. The signal appearing at the collector of the transistor 431 responsive to ringing of the telephone will therefore be applied through resistor 449 and wafer W–4 to the ring detector circuit 406.

The ring detector circuit is shown schematically in FIGURE 14 and can be seen to comprise silicon controlled rectifier 420 and transistor 426. The signal from wafer W–4 is applied to the base of transistor 426 through coupling capacitor 949, diode 451 and variable resistor 453. The juncture between capacitor 949 and diode 451 is connected through diode 455 to −12 volts. The base of transistor 426 is connected to −12 volts through parallel connected capacitor 457 and resistor 459. The collector of transistor 426 and the anode of silicon controlled rectifier 420 are connected to the "OR" gate 408 and through announcement motor 230 to ground. The emitter of transistor 426 is connected through resistor 461 to switch contact 422 of relay K–3. The emitter of transistor 426 is also connected to the gate electrode of the silicon controlled rectifier 420. Capacitor 463 is connected in shunt with resistor 461 and the cathode of silicon controlled rectifier 420 is also connected to switch contact 422. When relay K–3 is not energized, switch contact 422 is connected to contact 465 which in turn is connected through line G to terminal 424 of relay K–1. When relay K–1 is not energized, contact point 424 will be connected to −12 volts, applying −12 volts to the cathode of silicon controlled rectifier 420 and to the emitter of transistor 426. Thus, in response to the signal applied through wafer W–4, transistor 426 will be biased to become more conductive, causing the gate electrode of silicon controlled rectifier 420 to become less negative than its cathode, causing the silicon controlled rectifier 420 to switch to its low impedance state from the normal high impedance state. Current will therefore flow through silicon controlled rectifier 420 to the "OR" gate 408 and through the announcement motor 230.

Current flowing through the "OR" gate 408 from silicon controlled rectifier 420 is applied through wafer W–1 to energize solenoid 352 through switch contact 412. When solenoid 352 is energized, switch blade 412 will move downward connecting terminal 421 to ground and causing the current flowing through the coil of solenoid 352 to also flow through resistor 413, reducing the amount of current flowing through the winding of solenoid 352. It will be noted in this connection that the amount of current required to maintain solenoid 352 energized is much less than that required to initially energize a coil. The movable member 410 associated with solenoid 352 will also move in the downward position, opening the circuit comprising the contact microphone 320, pickup coil 324 and switch blade 410.

Also, when ground is applied to terminal 421 responsive to operation of solenoid 352, ground will be applied through line I to the ring detector circuit 406, preventing additional input signals being applied to the ring detector circuit. However, since the silicon controlled rectifier does not require a signal to be continuously applied to its gate electrode to maintain it in the low impedance state, but rather remains in the low impedance state so long as at least holding current flows between its anode and cathode, current will continue to flow through the announcement motor 230 and the "OR" gate 408 so long as −12 volts is applied to the cathode of silicon controlled rectifier 420. Also, when solenoid 352 is energized, the buttons of the telephone will be released, as described previously with reference to FIGURES 9–11.

As the announcement motor turns, the announcement tape will move across the playback head 274. The output of the playback head 274 is applied through wafer W–6, relay contact 423 of K–1, line H and contacts 471 and 473 of relay K–3 to the input of the preamplifier 430. The output of preamplifier 430 is connected to the input of amplifier 434. The output of amplifier 434 is applied to speakers 322 and 322*a*, causing the prerecorded announcement to be broadcast into the mouthpiece of the telephone receiver. Since the buttons on the telephone set are released, the recorded announcement will be heard by the calling party.

At the end of the announcement, the switch 290 will close as the contact 286 passes through the aperture in the announcement tape into contact with member 268, applying ground to the relay control circuit 440. The relay control circuit 440 is shown schematically in FIGURE 15 of the drawings. Thus, the relay control 440 can be seen to comprise silicon controlled rectifier 480 whose cathode is connected to −12 volts through resistor 482. There is also provided a voltage divider network comprising resistors 484 and 486 which is connected between −12 volts and ground through switch 290. Capacitor 488 is connected in shunt with resistor 486 and capacitor 489 is connected in shunt with resistor 484. The juncture between resistors 484 and 486 is connected to the gate electrode of silicon controlled rectifier 480. The anode of silicon controlled rectifier 480 is connected through resistor 490 to ground.

That portion of the circuit of FIGURE 15 described above will be operative if capacitors 488 and 489 are not provided. Thus, resistors 484 and 486 function as a voltage divider network through which current will flow when switch 290 is closed. It will be noted that switch 290 is closed when the aperture of the announcement tape is positioned between the resilient member 284 and the guide member 268, as described previously with reference to FIGURE 2 of the drawings. Thus, when current flows through the voltage divider network comprising resistors 484 and 486, the gate electrode of the silicon controlled rectifier will become more positive than its cathode, causing the silicon controlled rectifier 480 to switch from its normally high impedance state to a quasi stable low impedance state in which it remains as long as holding current flows. Thus, if capacitors 488 and 489 are not provided, the gate of silicon controlled rectifier 480 will be biased to turn the silicon controlled rectifier 480 on whenever switch 290 is closed.

It is preferable, however, that capacitor 488 be provided to prevent the silicon controlled rectifier being turned on by transients which may be present. Further, if capacitor 489 is also provided and resistor 484 is much larger than resistor 486 when switch 290 closes, current will flow to a charge capacitor 489, causing the silicon controlled rectifier 480 to be biased. After silicon controlled rectifier 480 turns on, capacitor 489 will continue to be charged until the voltage appearing across the capacitor 489 is substantially −12 volts and will remain charged to this level so long as switch 290 is closed. So long as capacitor 489 is charged, it will not be possible to again turn the silicon controlled rectifier on. Thus, whenever switch 290 is closed, the gate of silicon controlled rectifier 480 will be biased to turn silicon controlled rectifier 480 on.

The anode of silicon controlled rectifier 480 is connected to tone oscillator 444 for purpose of applying supply voltage to the tone oscillator 444. The tone oscillator is suitably a conventional free running multivibrator. The anode of silicon controlled rectifier 480 is also connected through capacitor 492 to terminal 494 of relay K–3, to one side of thermal delay relay 421 and through line E to the cathode of diode 495 (FIGURE 12*a*). The anode of diode 495 is connected to the anode of diode 496 and to one side of motor 158. The other side of motor 158 is connected to the cathode of diode 498, the anode of diode 498 being connected to contact 500 of relay K–2 and through bin switch 200 to ground. The cathode of silicon controlled rectifier 480 (FIGURE 15) is connected through resistor 502 to the base of transistor 504. The emitter of transistor 504 is connected to −12 volts and capacitor 506 is connected between the base and emitter electrodes of transistor 504. The collector of transistor 504 is connected through the coil of relay K–3 to ground. A diode 508 is connected in shunt with the coil of relay K–3 to protect against inductive surges. The collector of transistor 504 is also connected to the anode of diode 510, the cathode of diode 510 being connected through resistor 512 to the common terminal of wafer W–3.

When the switch 290 closes to ground at the end of the announcement, the silicon controlled rectifier 480 will be biased to its low impedance state and remain in the low impedance state so long as holding current flows between its cathode and anode terminals. As current flows through the silicon controlled rectifier 480 and resistor 490 to ground, supply voltage will be applied to the tone oscillator 444, causing the tone oscillator to produce an audible tone. The audible tone produced by the tone oscillator 444 is applied through line D to the amplifier 404 which drives the speakers 322 and 322*a*. The speakers 322 and 322*a* will then broadcast the audible tone, signaling the caller that the announcement is over and that if the caller desires to leave a message that it should be done at that time.

The transistor 504 will also be turned on responsive to the flow of current through silicon controlled rectifier 480, causing relay K–3 to become energized. When relay K–3 is energized, +15 volts will be applied to the bias oscillator 403 through line M (FIGURE 12*a*) and −12 volts will be applied to contact 494 of relay K–3 through contact 424 of relay K–1. The output of the record amplifier 400 will be applied through the line K to terminal 471 of relay K–3 to the input of the playback amplifier 434 and the connection between the output of amplifier 434 and speaker 322*a* will be broken such that the message being recorded will not be played back into the mouthpiece of the telephone receiver but the message will be heard in the immediate vicinity of the telephone. Thus, it is possible to monitor any messages without answering the telephone. It is important to note, however, that if the telephone receiver is lifted, neither of the speakers will be operated and the juncture between diode 510 and resistor 512 will be connected to ground through switch 355, preventing relay K—3 being energized when transistor 504 is not conductive.

When −12 volts is applied to capacitor 492 through terminal 424 of relay K-1 and terminals 422 and 465 of relay K-3 responsive to relay K-3 becoming energized, the anode of silicon controlled rectifier 480 will become sufficiently negative to cause the silicon controlled rectifier 480 to return to its normally high impedance state. The tone oscillator will thereupon no longer receive power and will cease to produce the tone. Also, transistor 504 will no longer be biased on. However, relay K-3 will be maintained in its energized state due to the flow of current from −12 volts connected through terminal 424 of relay K-1 and terminals 465 and 494 of relay K-3, thermal delay relay 421, line J, wafer W–3, resistor 512 and diode 510, provided the telephone receiver is not lifted. Current will also flow from the juncture between thermal delay relay 421 and terminal 494 through line E and diode 495 through record motor 158, diode 498 and bin switch 200 to ground, causing the record motor 158 to drive the message tape across the record head 190.

It will be noted that it is necessary to turn the silicon controlled rectifier 480 off to end the tone and turn transistor 504 off. If capacitor 489 is not provided, it is necessary to depend upon inertia of the announcement tape to move the aperture of the announcement tape past resilient member 284 to effectively open switch 290. On the other hand, if the capacitor 489 is provided and resistor 484 is substantially larger than resistor 486, upon closure of switch 290, silicon controlled rectifier 480 will be biased on, but when silicon controlled rectifier 480 is turned off responsive to capacitor 492 becoming charged, it will not thereafter become possible to turn the silicon controlled rectifier 480 on until capacitor 489 has become discharged subsequent to switch 290 again becoming open, as by operation of motor 230.

The record head 190 is connected through wafer W–8 to the output of the mixer 448 which receives signals from the record amplifier 400 and the bias oscillator 403. The message given by the caller will therefore be recorded so long as the record motor 158 is driven. After a time determined by the resistance of the variable resistor connected between the element 540 of thermal delay relay 421 as illustrated in FIGURE 12*b* and ground and the characteristics of the thermal delay relay, the switch 542 of thermal delay relay 421 will open, removing power from both the record motor 158 and the coil of relay K–3. The thermal delay relay 421 is of conventional type wherein a bimetallic contact member 542 is positioned in close proximity to the resistive element 540. As current flows through the resistive element 540, it will generate heat which is applied to the contact member 542. The bimetallic member 542 will bend, opening the electrical circuit when the bimetallic element 542 becomes sufficiently hot. The time required for the thermal delay relay 421 to open will, of course, be dependent upon the amount of current flowing through resistive element 540 and the characteristics of the bimetallic member 542.

When thermal delay relay 421 opens, motor 158 will stop and relay K–3 will become de-energized. Power will also be applied to the "OR" gate 508 from line E during the time interval beginning when relay K–3 is energized and ending when thermal relay 421 opens, maintaining solenoid 352 energized while the message is being recorded. When thermal delay relay 421 opens, solenoid 352 will become de-energized and the system will return to the initial state in readiness for subsequent calls.

So long as there is tape in the bin 66, the switch 202 will be in the condition shown in which each of the two contacts are closed. Thus, the lamp 24 will receive power from a source of potential, suitably +15 volts, and will be energized, indicating the recording and storage of a message which has not been received by the operator. Switch 202 will also provide a path for applying potential, suitably −12 volts, to motor 88 through the contacts of relay K–2, wafer W–2 and bin switch 202. It will therefore be possible to operate motor 88 to produce playback of the recorded message.

As additional calls are received, the above procedure will be repeated until the amount of tape available for recording of messages is exhausted. When tape is no longer available for the recording of messages, switch 200 will open the circuit through which power is applied to the record motor 158. This is important in that it prevents the record motor 158 being driven when a supply of tape is not available with the resultant possibility of breakage of the tape. Also, operation of switch 200 will cause ground to be applied through line N to the ring detection circuit 406, preventing operation of the device responsive to ringing of the telephone.

If it is desired to receive messages from a remote location, this can be accomplished by calling the number of the telephone being answered, in which event the operation of the system will be as described above through the point at which the tone is generated by the tone oscillator 444. However, upon broadcast of the tone from the tone generator indicating that the machine is in condition to receive messages, the interrogating party can receive the stored messages by placing the tone oscillator 38 adjacent the mouthpiece of the telephone from which he is calling. The tone generated by the tone oscillator will be applied to the reed amplifier in a manner similar to a ringing sound described above. Reed 447 of the tone sensing circuit 432, shown in FIGURE 13, will be driven at its resonant frequency.

Turning again to FIGURE 13, it can be seen that the reed 447 is connected to shunt capacitor 600 and resistor 602 which are connected in series between ground and one side of the resistor 604. The other side of resistor 604 is connected through resistor 606 to the base of transistor 608. The base of transistor 608 is connected through a parallel connected resistor 610 and capacitor 612 to line 611. The juncture between resistor 604 and resistor 606 is also connected through parallel connected capacitor 614 and resistor 616 to line 611. The juncture between resistors 604 and 606 is also connected through resistor 618 to the base of transistor 620, the emitter of transistor 620 being connected to line 611 and the collector of transistor 620 being connected to the playback amplifier through line E. The tone sensing circuit 432 also includes a transistor 622 whose emitter is connected through resistor 624 to line 611 and through resistor 626 to ground. It will be noted that resistors 624 and 626 function as a voltage dividing network. The collector of each of transistors 608 and 622 is connected to terminal 628 of switch 18. Switch 18 is spring loaded in the position shown in FIGURE 12*a*, and when not operated, the collector of transistor 622 will be connected through terminal 628 and the coil of relay K–2 to ground. Line 611 is connected to the anodes of diodes 650 and 652 and —12 volts will be applied to line 611 when either relay K–1 or K–3 is energized.

It is desirable that —12 volts be applied to line 611 only when either relay K–1 or relay K–2 is energized to prevent operation of the tone sensing circuit during the time that the announcement is being played back. When either of relays K–1 or K–3 is energized, —12 volts will be applied to line 611 and capacitor 600 will be charged to approximately —12 volts. Since capacitor 600 is substantially greater than capacitors 612 or 614, virtually no charge will appear across either of capacitors 612 and 614. When the signal applied to the relay is of a frequency the same as the resonant frequency of the reed 447, reed 447 will vibrate with the excursion of the reed being sufficient to periodically short across capacitor 600 and resistor 602. Capacitor 600 is provided to prevent generation of spikes that could damage the contacts of the reed relay. After a short period of time, suitably in the order of 0.10 second, capacitor 614 will become charged sufficiently to turn transistor 620 on. When transistor 620 turns on, squelching voltage is applied to amplifier 434, preventing the tone generated by the tone oscillator being amplified by amplifier 434 and reproduced as an audible signal by the speakers 322 and 322*a*. It is desirable that the squelching voltage be applied to amplifier 434 to prevent oscillatory conditions in which the recorded tone would actuate the system. After approximately two seconds of operation of the reed relay, capacitor 612 will be charged sufficiently to bias transistor 608 on. When transistor 608 turns on, it will also turn on transistor 622. When transistor 622 begins to conduct, —12 volts will be applied through the contacts of switch 18 to energize relay K–2, with relay K–2 remaining energized so long as the tone from the tone oscillator persists. Upon relay K–2 becoming energized, —12 volts will be applied through terminal 419 to energize the rewind solenoid 124 and through diode 417, wafer switch W–2 and normally closed bin switch 202 to energize the playback motor 88. The delay is important in that it insures discrimination between extraneous signals which may be generated randomly and the constant frequency tone generated by the tone oscillator. It will be noted that the playback motor 88 will be connected to ground through contact 630 of relay K–2 when relay K–2 is not energized and connected to ground through contact 500 and bin switch 200 when relay K–2 is energized.

—12 volts is also applied from the anode of diode 417 through diode 415 to energize the playback relay K–1. When playback relay K–1 is energized, —12 volts will no longer be applied through contact 424 of relay K–1 and line G to maintain the record relay K–3 energized when the silicon controlled rectifier 480 turns off. However, the record motor 158 will be driven for a short interval of time through a circuit comprising thermal delay relay 632, insuring that a sufficient amount of recording medium is placed in the playback bin to permit all messages to be completely received.

Also, when relay K–1 is energized, —12 volts will be applied through contact 634 of relay K–1 to the playback motor 88. As the playback motor turns, the tape containing the stored messages will move across playback head 130. However, so long as the tone from the tone oscillator is present, rewind relay K–2 will be energized, causing solenoid 124 to be energized, and the tape will move from the bin 68 to the bin 66. Upon termination of the tone, the tape will move across the playback head in the proper direction for playback of stored messages. The playback head is connected through contact 636 of relay K–1 and line H to the input of the preamplifier 430. The —12 volt potential will also be applied from terminal 634 of relay K–1 to the third input to the "OR" gate 408, maintaining the solenoid 352 energized for the duration of the playback cycle. It can be seen that relay 352 will be energized when either of the three motors receives power.

Since the relay K–3 will not be energized after relay K–1 is operated, the output of the playback amplifier 434 will be applied through terminal 431 of relay K–3 to both speakers 322 and 323, permitting the messages to be broadcast into the mouthpiece of the telephone receiver and received by the calling party.

After all of the tape in the playback bin containing the messages is moved across the playback head, the bin switch 202 will open, causing relay K–1 to become de-energized. When relay K–1 is de-energized, power will be removed from the playback motor 88 and from the solenoid 352, causing the playback motor 88 to stop and permitting solenoid 352 to become de-energized. The system will then return to its initial state. Also, when switch 202 is operated, lamp 24 will be de-energized.

It will be noted that, if in the course of receiving the stored messages, it becomes desirable to have a message repeated, it is possible to do so by again placing the tone oscillator adjacent the mouthpiece of the telephone used for calling. Upon this occurrence, the rewind solenoid K–2 will again become energized. When the rewind solenoid K–2 is energized, —12 volts is applied through terminal 419 of relay K–2 to energize the solenoid 124. As described previously, when solenoid 124 is energized, tape will be moved by the playback motor from the record bin into the playback bin. This process will continue so long as the tone from the tone oscillator is present. However, when the tone is removed, relay K–2 and solenoid 124 will again become de-energized and the playback of messages will continue.

FUNCTION SWITCH IN PLAYBACK POSITION

When the function switch is in the playback position, wafers W–1, W–3, W–4, W–7 and W–8 will be open. Wafer W–2 will apply —12 volts through bin switch 202 to the playback motor and the playback motor 88 will begin to run. Also, power will be applied through thermal relay 456, diode 498 and the bin switch 200 to the record motor 158, causing a small amount of tape to move into the playback bin 66. With the function switch in the playback position, the playback motor will run until the bin switch 202 opens, permitting the person operating the switch to receive any messages which have been recorded. It will be noted that since wafer W–1 is open, power cannot be applied to the solenoid 352 and the telephone will not be answered by the apparatus during the playback cycle, although the telephone will ring to signal the operator that a party is calling.

If, in the course of playback of messages, it becomes desirable to repeat a portion of the message, switch 18 can be operated. When switch 18 is operated, rewind relay K–2 will be energized resulting in solenoid 124 being energized. The rewind operation will continue so long as the rewind switch 18 is held closed. It will again be noted that switch 18 is spring loaded in the open position.

FUNCTION SWITCH IN CHECK POSITION

When the function switch is in the check position, the output of the "OR" gate 408 will be connected through wafer W–1 and resistor 630 to ground. Wafers W–2, W–3, W–4, W–7 and W–8 will be open. Wafer W–5 will be effective to apply +15 volts to the preamplifier 430 and playback amplifier 434, providing power to these two circuits. The input to the record amplifier 400 will be connected to ground through wafer W–9, preventing recording of messages. When the switch 34 on the hand mike is closed, the ring detector circuit 406 will apply −12 volts to the announcement motor, causing the announcement motor to run. As the tape moves across the playback head 274 associated with the announcement tape, the output of the playback head is applied through wafer W–6 and contact 423 of relay K–1 to the input of preamplifier 430. As described previously, the output of the preamplifier is connected through contact 471 of relay K–3 to the input of the playback amplifier 434 and the operator will hear the recorded announcement broadcast through speaker 323. At the end of the announcement, switch 290 will close, actuating relay control 440 to cause relay K–3 to become energized, removing power from the anouncement motor. Relay K–3 will only be energized momentarily as wafer W–3 is open, and when silicon controlled rectifier 480 returns to the high impedance state, relay K–3 will be de-energized.

FUNCTION SWITCH IN RECORD POSITION

When the function switch is placed in the record position, the output of the "OR" gate 408 will be connected to ground through wafer W–1 and resistor 460, preventing solenoid 352 becoming energized, but providing a ground for transistor 426 and silicon controlled rectifier 420 of the ring detector circuit 406. Wafers W–2, W–3 and W–4 will be open. The microphone 464 included in the hand microphone 32 is connected through wafer W–9 to the input of the record amplifier 400. The record amplifier 400 and the bias oscillator 403 are connected to the mixer 448, the output of the mixer being connected through wafer W–8 to the record head associated with the announcement tape. The output of the bias oscillator 403 is also connected through wafer W–7 to the erase head 272 associated with the announcement tape and the input to the preamplifier 430 is connected to ground through switch contact 423 of relay K–1 and wafer W–6. The bias oscillator receives +15 volts power from wafer W–5, permitting the bias oscillator to be operative.

When switch 34 is closed momentarily, silicon controlled rectifier 420 of the ring detector circuit will turn on, applying power to the announcement motor 230. As the announcement motor 230 turns, the tape will pass first across the erase head, which is driven by bias oscillator 403, erasing any message previously recorded thereon. It will then pass across the record head and any message spoken into the microphone 464 will be recorded on the tape. At the end of the tape, switch 290 will again close to ground, causing relay K–3 to become energized, removing power from the announcement motor and causing the announcement motor 230 to stop at a point which is in readiness to play back the announcement which has been recorded. It will be noted again that since there is not a path available for energizing the solenoid 352, the apparatus will not be effective to answer the telephone in the event the telephone should ring during the course of recording the announcement message.

From the foregoing description, it will be readily apparent that the present invention provides a telephone answering device having many advantages. Foremost among the advantages of the device of the present invention is that of immediate access to recorded messages made possible by the use of the endless recording medium wherein all of the recording medium that has passed over the playback heads is available for utilization by the record heads and all of the recording medium that has passed over the recording heads is available for utilization by the playback heads. The device can be interrogated either locally upon operation of an appropriate switch or remotely by applying to the device an extraneous signal of desired constant frequency. Provision of the rewind mechanism renders it possible to play back any portion of the messages that have been recorded as many times as desired, either from a remote location or if the operator is in the presence of the machine. Switching means responsive to the amount of recording medium available for utilization by the record and playback means are provided to prevent breakage of the tape or a recording medium also to prevent operation of the machine in the event a recording medium is not available for recording of messages. Further, it is possible to monitor all incoming calls without answering the telephone, but at any time that it may become desirable to do so, the telephone may be answered manually and the phone used in the normal manner without the necessity for performing any operation on the answering device itself. When the telephone receiver is replaced on the lifting device, the telephone answering system will again be in readiness to automatically accept the next call. Utilization of the device therefore does not cause any interference with normal telephone usage. There is also provided means for indicating whether the device has stored a received message in order that the operator will immediately know whether to interrogate the machine upon returning to the location of the telephone without the necessity for actually operating the machine to determine whether any messages have been stored.

Although the invention has been described with reference to a particular preferred embodiment of the same, many changes and modifications will become apparent to those skilled in the art in view of the foregoing description which is intended to be illustrative and not limiting of the invention defined in the appended claims.

We claim:

1. A telephone answering device for recording and playing back a message comprising:

(a) a length of recording material formed in an endless loop;

(b) erasing means for erasing information stored on said recording material as said recording material passes in close proximity to said erasing means;

(c) recording means for applying to said recording material signals to record on said recording material messages as said recording material passes in close proximity to said recording means;

(d) playback means for playback of the message recorded on said recording material as said recording material passes in close proximity to said playback means;

(e) first drive means for driving said recording material along a first path in close proximity to said erasing means and said recording means and in a first direction from said erasing means toward said recording means;

(f) second drive means for driving said recording material along a second path in close proximity to said playback means and in said first direction;

(g) means for controlling the operation of said first and second drive means; and (h) means responsive to the presence of an extraneous tone signal for operating said second drive means to drive said recording material along a path in close proximity to said playback means, and in an opposite direction to said first direction, said responsive means being effective only for the duration of said extraneous signal.

2. A telephone answering device for recording and playing back a message comprising:

(a) a length of recording material formed in an endless loop;

(b) erasing means for erasing information stored on said recording material as said recording material passes in close proximity to said erasing means;

(c) recording means for applying to said recording material signals to record on said recording material messages as said recording material passes in close proximity to said recording means, (d) playback means for playback of the message recorded on said recording material as said recording material passes in close proximity to said playback means;

(e) first means for driving said recording material along a first path in close proximity to said erasing means and said recording means and in a first direction from said erasing means toward said recording means;

(f) second drive means for driving said recording material along a second path in close proximity to said playback means and in said first direction;

(g) means for controlling the operation of said first and second drive means;

(h) a second length of recording material formed in an endless loop for recording an announcement portion, (i) third drive means for driving said second length of recording material along a path passing in close proximity to a second recording means and a second playback means;

(j) means responsive to the calling of a telephone associated with said answering device for actuating circuitry to permit messages to be transmitted and received along means coupling said answering device to said telephone and applying power to operate said third drive means; and (k) means responsive to the end of said announcement portion for generating a signal to actuate switching means which, when actuated, removes power from said third drive means and applies power to said first drive means.

3. A telephone answering device comprising:

(a) a length of elongated recording medium formed in an endless loop;

(b) first and second storage means for storing different portions of said recording medium;

(c) first drive means for transferring said recording medium from said first storage means to said second storage means;

(d) second drive means for transferring said recording medium from said second storage means to said first storage means;

(e) recording means effective when energized for recording signals on said recording medium as said recording medium is transferred from said first storage means to said second storage means when said first drive means is operated;

(f) play-back means effective when energized for producing signals recorded on said recording medium as said recording medium is transferring from said second storage means to said first storage means when said second drive means is operated;

(g) an endless announcement tape, characterized by having an aperture defined in a portion thereof;

(h) third drive means for driving said announcement tape along a path passing in close proximity to an announcement record head and an announcement play-back head; and (i) control circuitry including (1) means for controlling the energization of said recording means and said play-back means and the operation of said first and second drive means, (2) a switch comprising a resilient member mounted with one end thereof biased against said tape and a fixed member across which said announcement tape travels, said switch being closed when said aperture defined in said announcement tape is positioned between said resilient member and said fixed member, permitting said resilient member to contact said fixed member, closure of said switch signaling the end of the complete revolution of said announcement tape, (3) a switching device having first and second electrodes, said device normally exhibiting a high impedance between said first and second electrodes but being switched to a quasi stable low impedance state between said first and second electrodes responsive to a control signal applied thereto and remaining in said low impedance state so long as holding current flows between said first and second electrodes, (4) means connecting said device by said first and second electrodes in series with a source of supply voltage potential and an announcement motor comprising a portion of said third drive means, (5) means effective responsive to ringing of the telephone associated with said answering device for applying a control signal to said switching device to cause said device to switch to the low impedance state, and (6) means responsive to closure of said switch through said aperture in said announcement tape for interrupting a conductive path through said first and second electrodes and cause said device to return to the normally high impedance state.

4. A telephone answering device for recording and playing back a message comprising:

(a) a length of recording material formed in an endless loop;

(b) erasing means for erasing information stored on said recording material as said recording material passes in close proximity to said erasing means;

(c) recording means for applying to said recording material signals to record on said recording material messages as said recording material passes in close proximity to said recording means;

(d) playback means for playback of the message recorded on said recording material as said recording material passes in close proximity to said playback means;

(e) first drive means for driving said recording material on a first path in close proximity to said erasing means and said recording means and in a first direction from said erasing means toward said recording means;

(f) second drive means for driving said recording material along a second path in close proximity to said playback means and in said first direction;

(g) means for controlling the operation of said first and second drive means;

(h) a second length of recording material formed in an endless loop;

(i) third drive means for driving said second length of recording material along a path passing in close proximity to a second recording means and a second playback means;

(j) means responsive to calling of the telephone associated with said answering device for actuating circuitry to permit messages to be transmitted and received on lines connected to said telephone and applying power to operate said third drive means;

(k) means responsive to a complete revolution of said second length of recording material for stopping said third drive means;

(l) supporting means including a cradle for supporting a telephone receiver and a lever means effective when in one position to maintain the buttons of a telephone depressed and when in said second position to release said buttons;

(m) a solenoid;

(n) means for operating said lever means to said second position responsive to said solenoid being energized or said telephone receiver being removed from said cradle;

(o) means for energizing said solenoid when power is applied to one of said first, second and third drive means; and (p) means effective when said receiver is lifted from said cradle for preventing the application of power to said first and second drive means.

5. A telephone answering device comprising:

(a) a length of elongated recording medium formed in an endless loop;

(b) first and second storage means for storing different portions of said recording medium;

(c) first drive means for transferring said recording medium from said first storage means to said second storage means;

(d) second drive means for transferring said recording medium from said second storage means to said first storage means, said second drive means comprising first and second rotatable shafts, means for driving said first and second shafts in opposite directions, support means pivotally mounted with respect to said shafts and carrying first and second rotors, means biasing said support means to cause said first rotor to hold said recording medium against said first shaft whereby rotation of said first shaft will drive said recording medium from said second storage means to said first storage means, a solenoid effective when energized for pivoting said support means to cause said second rotor to hold said recording medium against said second shaft whereby rotation of said second shaft will drive said recording medium from said first storage means to said second storage means, and means for energizing said solenoid during the presence of an extraneous tone signal;

(e) recording means effective when energized for recording signals on said recording medium as said recording medium is transferred from said first storage means to said second storage means when said first drive means is operated;

(f) playback means effective when energized for reproducing signals recorded on said recording medium as said recording medium is transferred from said second storage means to said first storage means when said second drive means is operated;

(g) an endless announcement tape;

(h) a third drive means for driving said announcement tape along a path passing in close proximity to an announcement record head and an announcement playback head;

(i) means responsive to a complete revolution of said announcement tape for stopping said third drive means;

(j) means effective responsive to a complete revolution of said announcement tape for applying power to said first drive means for a settable time interval;

(k) control circuitry including (1) means for controlling the energization of the said recording means and said playback means and the operation of said first and second drive means;

(2) means responsive to ringing of the telephone associated with said answering device for actuating said third drive means;

(3) means responsive to the presence of an extraneous tone signal for removing power from said first drive means and applying power to said second drive means; and (l) means responsive to the presence of said extraneous tone signal for operating said second drive means to transfer said recording medium from said second storage means to said first storage means only for the duration of said extraneous tone signal.

6. A telephone answering device for recording and playing a message comprising:

(a) a length of recording material formed in an endless loop;

(b) erasing means for erasing information stored on said recording material as said recording material passes in close proximity to said erasing means;

(c) recording means for applying to said recording material signals to record on said recording material messages as said recording material passes in close proximity to said recording means;

(d) playback means for playback of the message recorded on said recording material as said recording material passes in close proximity to said playback means;

(e) first drive means for driving said recording material on a first path in close proximity to said erasing means and said recording means and in a first direction from said erasing means toward said recording means;

(f) second drive means for driving said recording material along a second path in close proximity to said playback means and in said first direction;

(g) means for controlling the operation of said first and second drive means;

(h) a second length of recording material formed in an endless loop;

(i) third drive means for driving said second length of recording material along a path passing in close proximity to a second recording means and a second playback means;

(j) means responsive to calling of the telephone associated with said answering device for actuating circuitry to permit messages to be transmitted and received along lines connected to said telephone and applying power to operate said third drive means;

(k) means responsive to a complete revolution of said second length of recording material for stopping said third drive means; and (l) first switching means and means responsive to a complete revolution of said second length of recording material generating a signal to actuate said first switching means, said first switching means being effective when actuated to remove power from said third drive means and apply power to said first drive means for a settable time period.

7. A telephone answering device as defined in claim 6 wherein said means for supplying power to said first drive means for a settable time interval includes a thermal delay relay.

8. A telephone answering device as defined in claim 1 further including means responsive to the presence of said extraneous signal for operating said second drive means to cause said recording material to be driven in a direction opposite to said first direction for the duration of said extraneous signal.

9. A telephone answering device as defined in claim 6 further including second switching means, means responsive to the presence of an extraneous signal for operating said second switching means to apply power to said second drive means for maintaining said second switching means actuated until substantially all of the recording material containing the messages recorded thereon is driven across said playback means.

10. A telephone answering device as defined in claim 9 further including means responsive to the application of power to said second drive means for applying power to said first drive means for a settable time interval sufficient to permit said second drive means to drive a portion of said recording material having a length at least equal to the separation between said first drive means and said second drive means.

11. A telephone answering device comprising:

(a) a length of elongated recording medium formed in an endless loop;

(b) first and second storage means for storing different portions of said recording medium;

(c) first drive means for transferring said recording medium from said first storage means to said second storage means;

(d) second drive means for transferring said recording medium from said second storage means to said first storage means;

(e) recording means effective when energized for recording signals on said recording medium as said recording medium is transferred from said first stortage means to said second storage means when said first drive means is operated;

(f) play-back means effective when energized for producing signals recorded on said recording medium as said recording medium is transferred from said second storage means to said first storage means when said second drive means is operated;

(g) an endless announcement tape;

(h) third drive means for driving said announcement tape along a path passing in close proximity to an announcement record head and an announcement play-back head; and (i) control circuitry including (1) means for controlling the energization of said recording means and said play-back means and the operation of said first and second drive means, (2) means responsive to ringing of the telephone associated with said answering device for activating said third drive means, (3) means responsive to a complete revolution of said announcement tape for stopping said third drive means, and (4) switch means operative responsive to the receiver of a telephone associated with the answering device being lifted from a lifting device subsequent to actuation of said third drive means for preventing operation of said first and second drive means.

12. A telephone answering device as defined in claim 11 further including a third vertically disposed bin for receiving and storing said announcement tape.

13. A telephone answering device as defined in claim 11 wherein said control circuitry further includes means effective responsive to a complete revolution of said announcement tape for applying power to said first drive means for a settable time interval.

14. A telephone answering device as defined in claim 13 wherein said control circuitry further includes means responsive to the presence of an extraneous tone signal for removing power from said first drive means and applying power to said second drive means.

15. A telephone answering device as defined in claim 14 further including means responsive to the presence of said extraneous tone signal for operating said second drive means to transfer tape from said first storage means to said second storage means only for the duration of said extraneous tone signal.

16. A telephone answering device as defined in claim 11 wherein said recording medium is a magnetic tape.

17. A telephone answering device as defined in claim 16, wherein said first and second storage means are first and second vertically disposed bins of a width greater than the width of said magnetic tape but substantially less than twice the width of said magnetic tape.

18. A telephone answering device as defined in claim 17 further including first switch means positioned in said first bin and effective responsive to removal of the substantial portion of the magnetic tape from said first bin for preventing operation of said first drive means to transfer said magnetic tape from said first bin to said second bin and second switch means positioned in said second bin and effective responsive to removal of the substantial portion of said magnetic tape from said second bin for preventing operation of said second drive means to transfer tape from said second bin to said first bin.

19. A telephone answering device as defined in claim 18 further including a lifting device adapted to support the receiver of a telephone associated with the device, said lifting device comprising a solenoid and means for depressing the buttons of a telephone when said solenoid is not energized and wherein said control circuitry includes means for energizing said solenoid responsive to power being applied to one of said first, second or third drive means.

20. A telephone answering device as defined in claim 18 further including means effective responsive to application of power to said second drive means for applying power to said first drive means for a time interval sufficient to insure that when said second drive means is operated, transferring tape from said second storage means to said first storage means, all of the tape containing recorded messages will be transferred from said second storage means to said first storage means prior to operation of said second switch means.

21. A telephone answering device as defined in claim 20 wherein said means effective responsive to application of power to said second drive means compirses a thermal delay relay connecting said first drive means to said second drive means.

References Cited

UNITED STATES PATENTS

| | | | |
|---|---|---|---|
| 2,703,821 | 3/1955 | Kopp et al. | 179—6 |
| 2,935,566 | 5/1960 | Karl | 179—6 |
| 2,937,237 | 5/1960 | Zanardo | 179—6 |
| 3,041,417 | 6/1962 | Stroud et al. | 179—100.2 |
| 3,127,474 | 3/1964 | Waldman | 179—6 |
| 3,134,089 | 5/1964 | Bogoff et al. | 179—100.2 |
| 3,135,831 | 6/1964 | Youtie | 179—6 |
| 3,136,856 | 6/1964 | Zimmermann | 179—6 |
| 3,156,771 | 11/1964 | Vaughn | 179—6 X |
| 3,360,613 | 12/1967 | Cooper | 179—100.2 |

BERNARD KONICK, Primary Examiner

R. F. CARDILLO, Jr., Assistant Examiner

U.S. Cl. X.R.

179—100.2